(12) United States Patent  
Howell et al.

(10) Patent No.: US 7,706,928 B1
(45) Date of Patent: Apr. 27, 2010

(54) ENERGY MANAGEMENT SYSTEM WITH SECURITY SYSTEM INTERFACE

(75) Inventors: Donald W. Howell, Troutville, VA (US); Mark W. Vinson, Roanoke, VA (US); Frank O. Blevins, Salem, VA (US); Armand J. Tamagni, Jr., Troutville, VA (US); Michael L. Campbell, Roanoke, VA (US)

(73) Assignee: ADMMicro Properties, LLC, Roanoke, VA (US)

( * ) Notice: Subject to any disclaimer, the term of this patent is extended or adjusted under 35 U.S.C. 154(b) by 380 days.

(21) Appl. No.: 11/470,607

(22) Filed: Sep. 6, 2006

Related U.S. Application Data

(60) Provisional application No. 60/714,270, filed on Sep. 7, 2005.

(51) Int. Cl.
   *G05B 17/00* (2006.01)
   *G08B 29/00* (2006.01)

(52) U.S. Cl. .................. 700/295; 700/276; 340/506; 702/188; 713/340

(58) Field of Classification Search .................. 700/21, 700/291, 295, 276, 277, 293; 702/188; 340/506; 713/320, 340; 455/433
See application file for complete search history.

(56) References Cited

U.S. PATENT DOCUMENTS

| | | | |
|---|---|---|---|
| 4,034,233 A | 7/1977 | Leyde | |
| 4,167,679 A | 9/1979 | Leyde et al. | |
| 4,345,162 A | 8/1982 | Hammer et al. | |
| 4,567,557 A | 1/1986 | Burns | |
| 4,965,492 A | 10/1990 | Boldwyn | |
| 5,293,755 A | 3/1994 | Thomas | |
| 5,384,697 A | 1/1995 | Pascucci | |
| 5,416,781 A | 5/1995 | Ruiz | |
| 5,572,438 A | 11/1996 | Ehlers et al. | |
| 5,650,936 A | 7/1997 | Loucks et al. | |
| 5,861,683 A | 1/1999 | Engel et al. | |
| 5,862,391 A | 1/1999 | Salas et al. | |
| 5,962,989 A | 10/1999 | Baker | |
| 5,971,597 A | 10/1999 | Baldwin et al. | |

(Continued)

FOREIGN PATENT DOCUMENTS

EP    0841605    5/1998

(Continued)

OTHER PUBLICATIONS

Dencor Energy Control Systems, "Dencor Bill Reducer", pp. 1-5, [online], [retrieved on Apr. 22, 2004]. Retrieved from the Internet <URL: http://www.dencorinc.com/thebill.htm/>.

(Continued)

*Primary Examiner*—Paul L Rodriguez
*Assistant Examiner*—Sheela Rao
(74) *Attorney, Agent, or Firm*—Novak Druce & Quigg LLP

(57) ABSTRACT

A system that establishes a local dynamic data link between an energy management system (EMS) and a security system (SS) within a building. A power management device, including a monitor module that directly monitors energy usage of at least one energy load to generate at least one measurement of energy usage by said at least one energy load; and a security module operatively coupled to the monitor module.

31 Claims, 22 Drawing Sheets

U.S. PATENT DOCUMENTS

| | | | |
|---|---|---|---|
| 6,029,092 | A | 2/2000 | Stein |
| 6,119,125 | A | 9/2000 | Gloudeman et al. |
| 6,181,985 | B1 | 1/2001 | O'Donnell et al. |
| 6,211,783 | B1 | 4/2001 | Wang |
| 6,236,332 | B1 | 5/2001 | Conkright et al. |
| 6,285,912 | B1 | 9/2001 | Ellison et al. |
| 6,301,527 | B1 | 10/2001 | Butland et al. |
| 6,553,418 | B1 | 4/2003 | Collins et al. |
| 6,556,875 | B1 | 4/2003 | Nagasaka et al. |
| 6,571,140 | B1 | 5/2003 | Wewalaarachchi et al. |
| 6,615,088 | B1 | 9/2003 | Myer et al. |
| 6,681,154 | B2 | 1/2004 | Nierlich et al. |
| 6,724,157 | B2 | 4/2004 | Kazanov et al. |
| 6,725,104 | B2 | 4/2004 | Lo et al. |
| 6,728,646 | B2 | 4/2004 | Howell et al. |
| 6,751,562 | B1 | 6/2004 | Blackett et al. |
| 6,819,239 | B2 | 11/2004 | Bingham |
| 6,993,417 | B2 | 1/2006 | Osann, Jr. |
| 7,460,930 | B1 | 12/2008 | Howell et al. |
| 2001/0018712 | A1 | 8/2001 | Swales et al. |
| 2002/0029085 | A1 | 3/2002 | Park |
| 2002/0175641 | A1 | 11/2002 | Andersen et al. |
| 2002/0175642 | A1 | 11/2002 | von Kannewurff et al. |
| 2003/0050737 | A1 | 3/2003 | Osann, Jr. |
| 2003/0125886 | A1 | 7/2003 | Spitaels et al. |
| 2003/0204756 | A1 | 10/2003 | Ransom et al. |
| 2004/0002792 | A1 | 1/2004 | Hoffknecht |
| 2004/0024483 | A1 | 2/2004 | Holcombe |
| 2004/0054829 | A1 | 3/2004 | White, III et al. |
| 2005/0013075 | A1 | 1/2005 | Kohlmeier-Beckmann et al. |
| 2005/0039040 | A1 | 2/2005 | Ransom et al. |
| 2005/0040943 | A1 | 2/2005 | Winick |
| 2005/0090915 | A1 | 4/2005 | Geiwitz |
| 2005/0096797 | A1 | 5/2005 | Matsubara et al. |
| 2005/0097162 | A1 | 5/2005 | Budike, Jr. |
| 2005/0125083 | A1 | 6/2005 | Kiko |
| 2005/0131583 | A1 | 6/2005 | Ransom |
| 2005/0222820 | A1 | 10/2005 | Chung |
| 2006/0025891 | A1 | 2/2006 | Budike, Jr. |
| 2006/0259184 | A1* | 11/2006 | Hayes et al. ................. 700/221 |
| 2007/0075854 | A1* | 4/2007 | Tyler .......................... 340/541 |
| 2007/0282547 | A1 | 12/2007 | Howell et al. |

FOREIGN PATENT DOCUMENTS

| | | |
|---|---|---|
| JP | 2000059404 | 2/2000 |

OTHER PUBLICATIONS

Reliable Controls, "Product Controllers", pp. 1-2, [online], [retrieved on Apr. 22, 2004]. Retrieved from the Internet <URL: http://www.reliablecontrols.com/products/controllers/>.

Reliable Controls, "Reliable Controls MACH-System", pp. 1-6, [online], [retrieved on Apr. 22, 2004]. Retrieved from the Internet <URL:www.reliablecontrols.com/products/catalogue/product_promotional.pdf>.

ISEP Modbus Alert Email (Email -Alert-03), [online]. [retrieved on Apr. 26, 2004] Retrieved from website of ise_p.com using Internet <URL:http://www.ise_p/links/Alertgateway/MODEMAIL.htm>.

LinkNet TM Platform, [online], [retrieved on Apr. 27, 2004] Retrieved from website of kavel.com using Internet <URL:http:/www.kavel.com>LinkNet TM Platform, [online], [retrieved on Apr. 27, 2004] Retrieved from website of kavel.com using Internet. <URL:http:/www.kavel.com>.

BMA BACnet Manufacturers Association, Catalogue Listings for BA net Application Specific Controller (B-ASC), [online], [retrieved on Apr. 27, 2004] Retrieved from website of www.bacnetassociation.org using Interner <URL:http:///wwwbacnetassociation.org/BMAProductCatalogue/Profiles/A11B-ASC.htm>.

BACnet Today, ASHRAE (American Society of Heating, Refrigerating and Air-Conditioning Engineers) Journal, p. 10-17 (Oct. 2002).

ADM-3311 Specifications, ADMMicro, LLC (Jul. 24, 2002).

e-mail from Mark Vinson of Jun. 27, 2002.

Document containing e-mails from Don Howell of May 23, 2003 and May 20, 2003.

ADM-3311, The Multi-Circuit High Density Power Monitor From ADMMicro, Product Overview (May 20, 2003).

Office action mailed Apr. 7, 2008 by USPTO for U.S. Appl. No. 11/741,744 (published as US published patent application No. 2007/0282547) to Howell et al.

Non-Final Office Action issued in U.S. Appl. No. 11/128,344 (now US Patent No. 7,460,930) dated Jun. 7, 2007.

Final Office Action issued in U.S. Appl. No. 11/128,344 (now US Patent No. 7,460,930) dated Nov. 19, 2007.

Notice of Allowance issued in U.S. Appl. No. 11/128,344 (now US Patent No. 7,460,930) dated Oct. 10, 2008.

Notice of Allowance issued in U.S. Appl. No. 11/741,744 dated Dec. 16, 2008.

Intelicom Innovation NetBiter TM, [online]. [retrieved on Apr. 26, 2004] Retrieved from website of www.intellicom.se using Internet <URL:http://www.intelicom.se/eg_netbiter.shtml>.

* cited by examiner

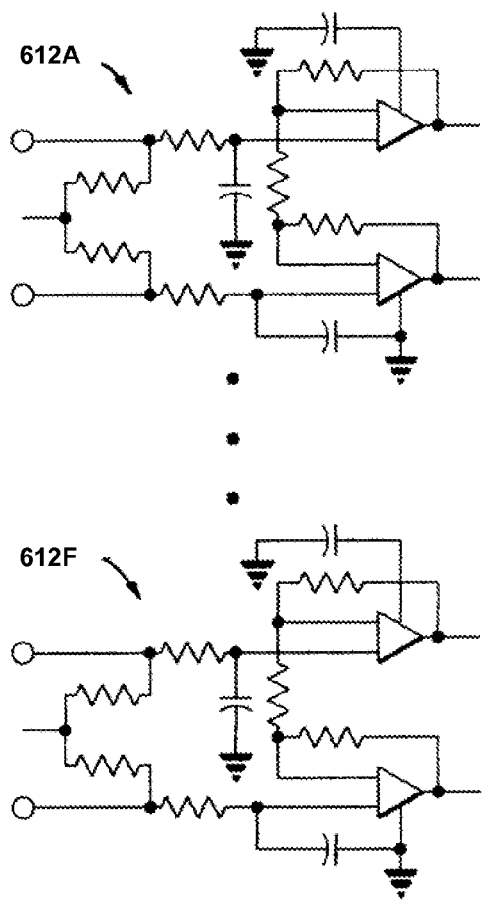
FIG. 11B
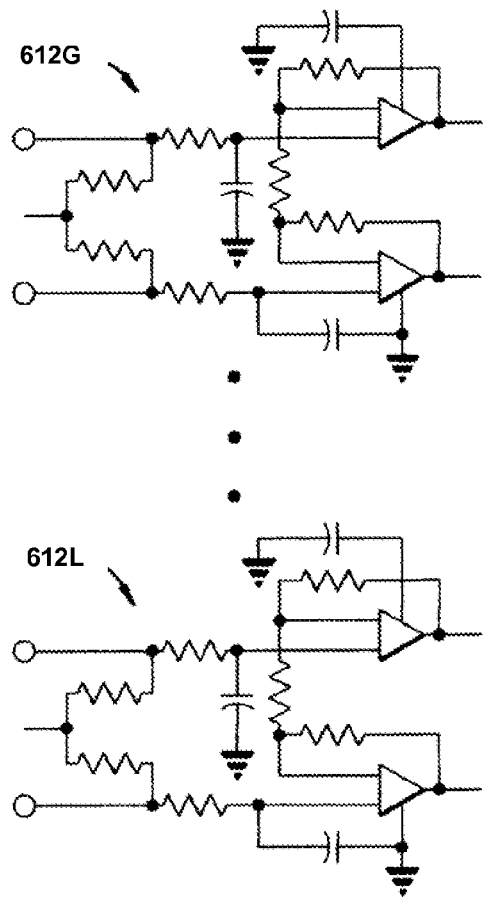
FIG. 11C
FIG. 11I
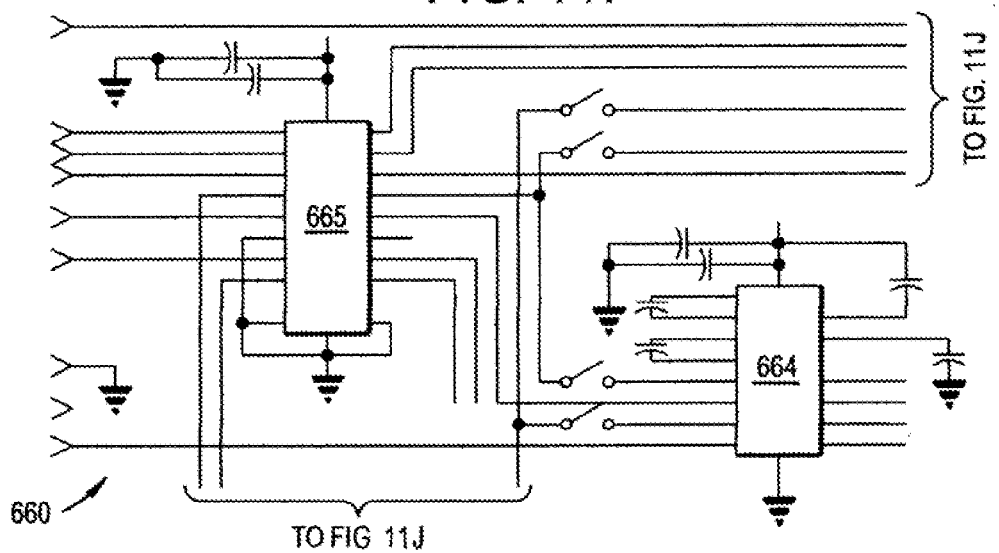

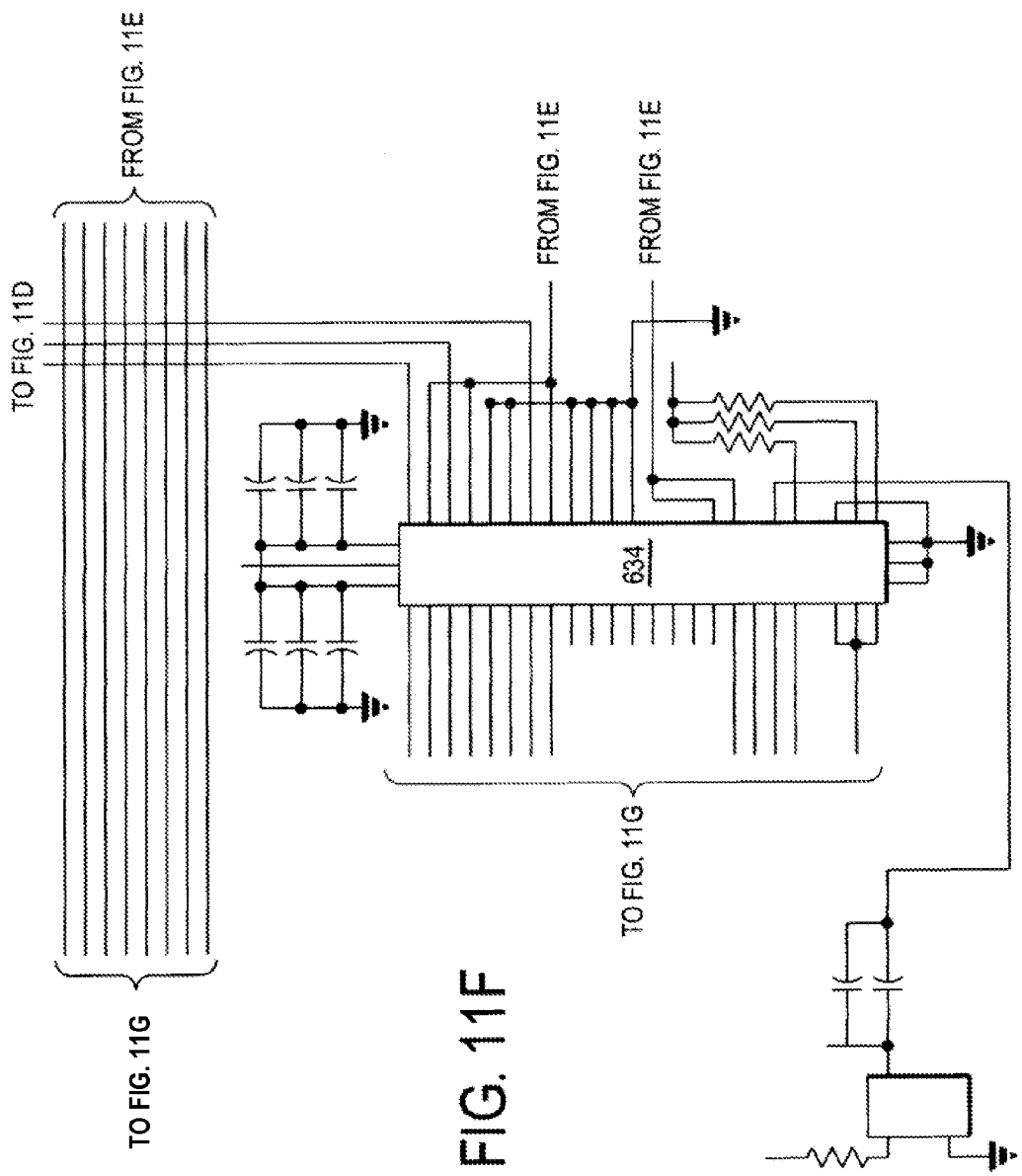

ENERGY MANAGEMENT SYSTEM WITH SECURITY SYSTEM INTERFACE

This application claims the benefit of U.S. provisional patent application No. 60/714,270, filed Sep. 7, 2005, incorporated herein by reference.

BACKGROUND OF THE INVENTION

1. Field of the Invention

The present invention relates to a system that establishes a local dynamic data link between an energy management system (EMS) and a security system (SS) within a building. The present invention also relates to an EMS having the capability of communicating with a SS and performing any of a number of functions.

2. Discussion of Background

Many buildings contain both energy management and security systems. The energy management systems are primarily intended to manage energy usage through automatic control of lighting and HVAC units. In many cases, individual in-building energy management systems have wide area data communications capabilities so that multiple buildings can be managed centrally from a remote location. The security systems are primarily intended to monitor human access to the facility and to generate alarms when unexpected (unauthorized) access is detected. Security systems will generally have wide area data communications capabilities so that alarm indications can be routed to appropriate authorities, such as law enforcement agencies, in a timely manner.

The wide area data communications capabilities (wide area data link) associated with both the above mentioned systems (energy management and security) might include a telephone modem, wired network/Internet connectivity, or various forms of wireless wide area data communications such as via cellular phone systems.

U.S. Pat. No. 6,728,646 to Howell et al., incorporated herein by reference, discloses an energy information system and sub-measurement board for use therewith which allows an energy information service provider to measure energy usage at a customer location. The sub-measurement board is connected to an energy distribution panel located at the customer location and measures energy usage of individual circuits of the distribution panel. The sub-measurement board outputs a load profile of the energy usage and transmits the load profile to the energy information service provider via a wide area network (WAN). The load profile is processed by the energy service provider and posted on a server for access by the customer. Voltages and currents are input into a microprocessor circuit, which compares the currents one at a time to the voltages to match the current with the voltage of the same individual circuit and to calculate the load profile of the individual circuit.

U.S. Pat. No. 5,862,391 to Salas et al., incorporated herein by reference, discloses a power management control system comprising a computer (server) having standard RS485 interface cards and adapters installed in its I/O slots defining multiple industry standard Modbus RTU networks and Ethernet TCP/IP networks and the computer contains software for monitoring and controlling power usage/consumption captured by remotely controlled devices (Abstract). There is no on-board or downloadable capability for software/firmware power management or for direct device-to-device communication.

US Patent Application No. 2005/0040943 A1 to Winnick, incorporated herein by reference in its entirety, discloses an interconnected HVAC system and a Security system. The HVAC system uses a series of thermostats that transmit data via RF to a controller. The security system includes wireless controls or keypads, and uses an on RF frequency, modulation and a set of communication protocols that are common to both the security and HVAC systems. This commonality in transmission permits that the security system to receive communication from the thermostats, and the security system is capable of controlling the thermostats by manual intervention via a GUI or keyboard. The purpose would be, for example, if an IR sensor of the security system does not sense anyone in a room, this information can be transmitted to the thermostat in the form of a command to reduce the amount of heat or air conditioning. Also, if a fire or smoke detector is activated, the information can be passed on to the HVAC system to automatically power down the HVAC system as a safety precaution. However, these systems do not, for example, have controllers that directly communicate with one another, and there is no provision for communicating information on behalf of one system that might be down by the other system.

US Patent Application 2004/0024483 A1 to Holcombe, incorporated herein by reference, discloses a system, method and article of manufacture for monitoring and optimizing utility usage in an entity. Paragraph 0069 at page 4 discloses as an option that a central control unit may interact with appliances or interface modules for altering their cycle as needed or can turn them on or turn them off at different times.

US Patent Application 2003/0050737 A1 to Osann, Jr., incorporated herein by reference, discloses an energy-smart home system (see FIG. 1) that requires energy monitoring and control points installed at switches, plugs, and other points of energy use and communication with a power line data link to a centrally located intelligent device such as a PC, residential gateway, and the like for viewing and energy control functions. A separate electrical breaker box supplements the distributed energy monitoring and control points. The energy-smart system of Osann, Jr. provides internet access to the centrally located intelligent device, utility company, and other service providers (e.g., security) as well as a utility company power meter. Subloads controlled can include direct wired subloads, such as an air-conditioner or furnace.

U.S. Pat. No. 4,034,233 to Leyde, incorporated herein by reference, discloses a power monitoring and regulating circuit and method having an analog input representing power delivery rate and a digital output for controlling the on/off states of a plurality of loads (see column 2, lines 37 to 67; claim 1). This invention contemplates the use of a settable set point which through circuitry (and not firmware) the invention seeks to attain to regulating the number of loads connected to the power source.

U.S. Pat. No. 4,167,679 to Leyde, et al., incorporated herein by reference, discloses floating set point control circuit and method for use with electrical load control systems. Column 1, lines 1-36 and claims 1, 8 and 16 disclose an electrical load control systems that continuously measures the rate of power delivered to a plurality of loads and when a predetermined rate, termed a set point, is exceeded or conversely, then one or more of the plurality of loads is disconnected (shed) or connected (added).

U.S. Pat. No. 4,345,162 to Hammer, et al., incorporated herein by reference, discloses a method and apparatus for load-shedding duty cycling that overrides a normal thermostat control (see claim 1). A signal from a power utility company is received to the thermostat, such as a radio signal. This invention does not measure power use and controls a single load.

U.S. Pat. No. 5,971,597 to Baldwin et al., incorporated herein by reference in its entirety, discloses a system of multifunction sensors and network sensor system. A common network communication and control processor is coupled to a common communication transceiver. The sensors are capable of reporting about a plurality of items sensed, such as light, temperature to a security system and/or an energy management system. There is no disclosure about measuring power use and neither is there disclosure about loads subsequently being controlled according to a measured power reading. This invention also fails to disclose the provision of an alternate path for reporting by linking communications of a security system and an HVAC system.

U.S. Pat. No. 6,181,985 to O'Donnell et al., incorporated herein by reference, discloses a load shed module for use in a power distribution system that includes facility for delivering both electrical power and electrical power rate information from a utility supplier. This invention is physically placed between and interfaces to a utility power source and a load and requires manually setting a rotary switch on the to a threshold rate. The setting of the rotary switch is compared by the invention with a rate received from a utility supplier. If the received rate exceeds the manually set rate the invention disconnects a load from the power source.

U.S. Pat. No. 6,301,527 B1 to Butland, et al., incorporated herein by reference, discloses a Utilities Communications Architecture (UCA) compliant power management control system. Column 2, lines 9-25, discloses first and second intelligent electronic devices communicating over a first and second network with first and second servers that process data received from first and second intelligent electronic devices to manage power use. TCP/IP and RS-485 protocol are supported (claims 2, 8, and 10) as well as other protocols. This invention envisions software loaded into computers and servers to provide access to and control of power management data and functions, respectively, of intelligent electronic power management and control devices of an electrical distribution system. Dencor (http://www.dencorinc.com; Dencor Bill Reducer, [online], [retrieved on 2005 Apr. 22] which is retrieved from website of dencorinc.com using Internet <URL:http//www.dencorinc.com/thebill.html/>) provides an expansion module for controlling multiple loads via a single unit in order to reduce energy consumption. Reliable Controls (http://www.reliablecontrols.com; Reliable Controls Products Controllers, [online], [retrieved on 2005 Apr. 22] Retrieved from website of reliablecontrols.com using Internet www.reliablecontrols.com using Internet URL:

http//www.reliablecontrols.com/products/controllers.
Reliable Controls MACH—System [online], [retrieved on 2005 Apr. 22] Retrieved from website of reliablecontrols.com using Internet URL:

http://www.reliablecontrols.com/products/catalogue/product_promotional.pdf>)

provides a MACH-Global Controller that provides LAN communication through nine ports to 128 universal input-output hard points, and a MACH1 and MACH2 controller each supporting communication ports and eight inputs and outputs as well as up to three expansion cards by the MACH2. These systems are described as providing cost effective management of power consumption, e.g., "The Reliable Controls® MACH-System is a computer-based system of hardware and software products designed to control the comfort and manage the energy consumption of the environment with commercial buildings. The system consists of: programmable controllers which have inputs and outputs that are connected to sensors and actuators used to measure and control the environment; network communications to network the controllers to facilitate sharing data and archiving data; PCs to run the various software programs used to program, operate and backup the system" (from web-site FAQ).

SUMMARY OF THE INVENTION

The present invention provides a system and method for establishing a local dynamic data link between the energy management system (EMS) and the security system (SS) within a building.

The present invention also provides a device which takes advantage of the low-cost, high-performance microprocessors that are readily available today by embedding EMS and SS algorithms in software locally resident on the device, preferably firmware, directly interfaced with multiple-circuit power monitoring electronics. The device is part of the EMS and contains the embedded EMS and SS algorithms in software locally resident on the device such that it also contains a security module for communicating with the SS of a building. The device communicates with the SS by wireless communication, wired communication or both.

The system typically includes an EMS device designed as a collection of components in close proximity to each other, e.g., within a single housing or within 5 or less feet apart or within 24 or 12 or less inches apart or within two or more adjacent housings, which also has the capability to establish a local dynamic data link between the energy management system (EMS) and the security system (SS) within a building.

In a first aspect of the invention, a power management device includes an energy monitoring module of an energy management system (EMS) that directly monitors energy usage of at least one energy load to generate at least one measurement of energy usage by the at least one energy load.

In addition, a security module of a security system (SS) is operatively coupled to the energy monitoring module. Both the energy monitoring module and the security module are typically arranged within a building being monitored, or in close proximity to the building being monitored. At least one of the EMS and SS includes means to communicate with at least one entity selected from the group consisting of police department, fire department, security company, custodial personnel, gas or utility company, first responder and facilities manager, and the communication occurs preferably over (but not limited thereto) a Wide Area Data Link. The communication could occur via RF, wire, fiber optic satellite, or any known transmission protocol.

Typically, the security module detects at least one or more alarm conditions and notifies the energy monitoring module of a detected alarm via a local data link.

The energy monitoring module additionally controls an operation of the at least one energy load, with the energy monitoring module controlling a function selected from the group consisting of: (i) turning on and off building lights, (ii) turning on and of video surveillance cameras; and (iii) activating and deactivating alarms. The number of lights either flashed, turned on or off, alarms sounded, etc. would depend on the severity of the alarm. The amount and duration of items flashed, turned on and off, etc. is determined according to a category of the alert, which is supplied by the security module along with the notification of the alarm status.

Also, the power management device embeds energy management system algorithms and security system algorithms in one of: (1) a software locally resident and (2) a firmware (preferably) in one or more microprocessors of the power management device.

The EMS turns on all or a subset of building lights when the SS indicates, via the local data link, that certain alarm conditions have been detected;

The EMS repetitively "flashes" all or a subset of building lights when the SS indicates, via the local data link, that certain alarm conditions have been detected;

The EMS turns on all or a subset of building lights when the SS indicates, via the local data link, that valid building access has occurred during normally unoccupied building hours—when lighting would otherwise be off or significantly reduced.

Other energy loads, such as video surveillance cameras or sound generating devices, can also be activated in addition to or in lieu of the lights.

The EMS may employ sensors of the SS to control loads (by turning loads on or off) to optimize energy consumption. For example, the arming of the SS by a person using the system may trigger turning the lights off because the arming of the SS implies people are leaving the building monitored by the SS. Also, if the SS sensors detect no motion in a building area then the EMS could turn off the lights in that area, The EMS automatically provides an alternative backup wide area data link (see FIG. 1), via the local dynamic data link, for the SS so that SS alarms and other data communications will be provided, for example, to appropriate agencies such as local police departments, fire departments, etc. receive reporting information about the alarm condition even when the SS primary wide area data link is unavailable. Although the EMS and SS may be locally sounding alarms, flashing lights, etc. it is preferred that local law enforcement authorities be notified over the wide area data link to provide an appropriate response to the alarm condition and its category.

The EMS monitors the SS (security system), or both the EMS and SS automatically monitor each other (operation described in FIG. 4), via the local dynamic data link, and provide notification, via the normal wide area data link associated with each system, when the other system is not functioning as expected. For example, the EMS monitors the SS by polling in which the EMS issues a command requesting data from the SS, in particular asking if the SS is still operating. For instance, the EMS may periodically ping the control module of the SS. If the EMS does not get a response, the EMS Sends Notification of SS Abnormal Condition, via EMS Wide Area Data Link to the security service provider, for example, a security company, local police or the owner of the building in which the SS is located.

The local dynamic data link might be wired, such as a RS-232 serial data link, or a wireless data link.

BRIEF DESCRIPTION OF THE DRAWINGS

FIGS. 11B and 11C illustrate enlarged views of a current monitoring interface of the combination monitor-controller illustrated in FIG. 11A.

FIGS. 11E and 11F illustrate enlarged views of an analog-to-digital converter of the combination monitor-controller illustrated in FIG. 11A.

FIGS. 11I and 11J illustrate enlarged views of a remote communication interface of the combination monitor-controller illustrated in FIG. 11A.

DETAILED DESCRIPTION OF THE INVENTION

A first aspect of the invention provides a combined system comprising a power management system and a security system that are interfaced with each other.

Figure 1:
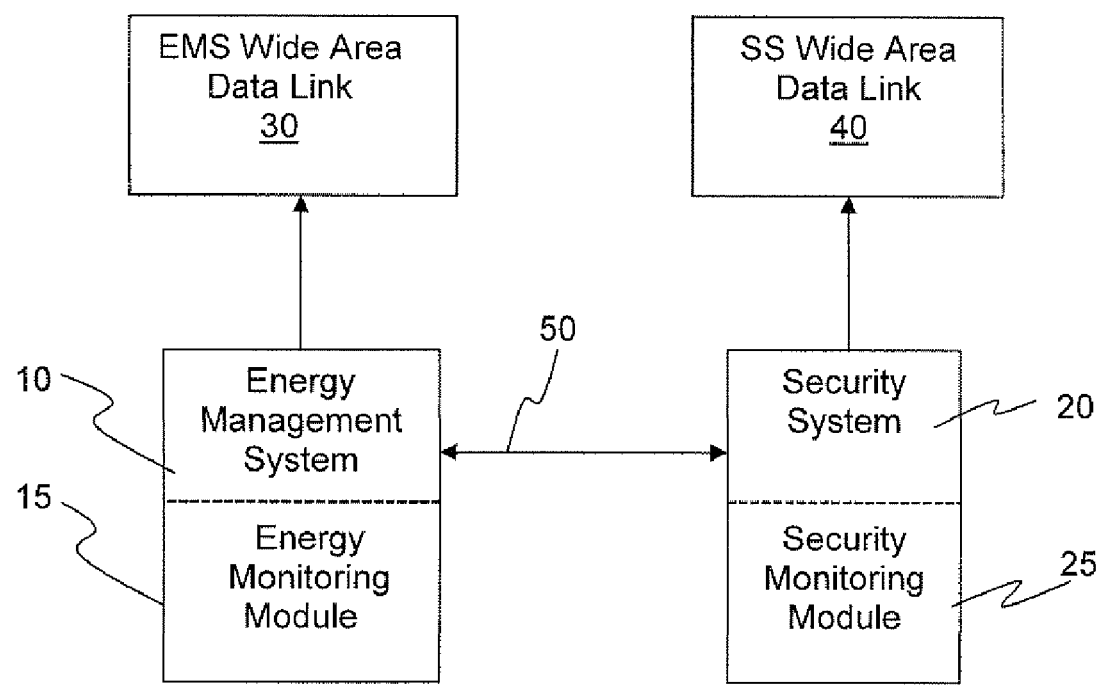
FIG. 1 shows an In-Building System Diagram of a system employing the present invention.

Referring to FIG. 1, for example, the combined system includes the in-building systems of an energy management system (EMS) 10 having an energy monitoring module 15 and a security system (SS) 20 having a security monitor module 25. The energy monitoring module 15 is the portion of the EMS that specifically monitors the power delivery and the power usage, current and voltage usage by one or more loads, whereas the security monitoring module monitors whether there are any open doors detected, any open windows or broken glass detected, infrared detection of personnel in a given area, motion detection. etc.

The EMS 10 is connected to an EMS wide area data link 30, and the SS 20 is connected to an SS wide area data link 40. The EMS 10 and (respective energy monitoring module 15) and the SS 20 (and the respective security monitoring module 25) are adapted for arrangement within a common building.

Still referring to FIG. 1, the EMS 10 and the SS 20 are connected by a local dynamic data link 50 to permit monitoring, notification and control functions to be performed by either or both systems in the event that there is a problem with one of the systems, or its wide area link. To summarize, the dynamic data link is used to transmit data, and optionally testing and control commands between these two systems to accomplish. For example, the EMS 10 automatically controls the building's lights when the SS 20 indicates, via the local dynamic data link 50, various building security events have been detected, such as different categories of alarm conditions due to unauthorized access, fire, flood, glass breakage, etc. For example, motion detectors in the building associated with the security system can send a signal to the energy management system via the local dynamic data link 50 to turn on lights in a portion of the building when the motion detectors detect the presence of a person, possibly an intruder. A particular access can be considered a normal condition or an alarm condition depending on the time of day and the visitors' access rights, and lights may be turned on and certain areas provided with heating, cooling, etc., depending on the time of day and the visitors' access rights.

The EMS 10 and the SS 20 repeatedly monitor, e.g., poll, each other the local dynamic data link 50. If during this monitoring, e.g., polling, if it is determined that either the EMS wide area data link 30 or the SS wide area data link 40 is disconnected, or the local dynamic data link 50 is disconnected, then an alarm signal is sent by the remaining wide area data link to an outside security, safety, fire or rescue agency such as the police department, fire department, security company, custodial personnel, first responder and facilities manager. Furthermore, if the monitoring, e.g., polling, detects either the EMS wide area data link 30 or the SS wide area data link 40 is disconnected, or the local dynamic data link 50 is disconnected, the EMS may turn on all the lights.

With regard to the actual control of items such as lights, etc., FIGS. 5-8 show a system to provide measurement and control capabilities for monitoring and controlling a plurality of single phase and poly-phase electrical loads. U.S. Pat. No. 6,728,646 to Howell et al., incorporated herein by reference, discloses an energy information system and sub-measurement board for use therewith allows and energy information service provider to measure energy usage at a customer location. The devices of these documents can be modified by changing their firmware to result in devices with some or all of the other features already present in these devices and the additional capability to establish a local dynamic data link between the energy management system (EMS) and the security system (SS) within a building. For wired communication the devices could communicate through an Ethernet connection to a burglar alarm system. To provide wireless notification a wireless modem could be added to these devices. The wireless backup is advantageous if a burglar were to cut the phone wire of the SS.

Figure 2:
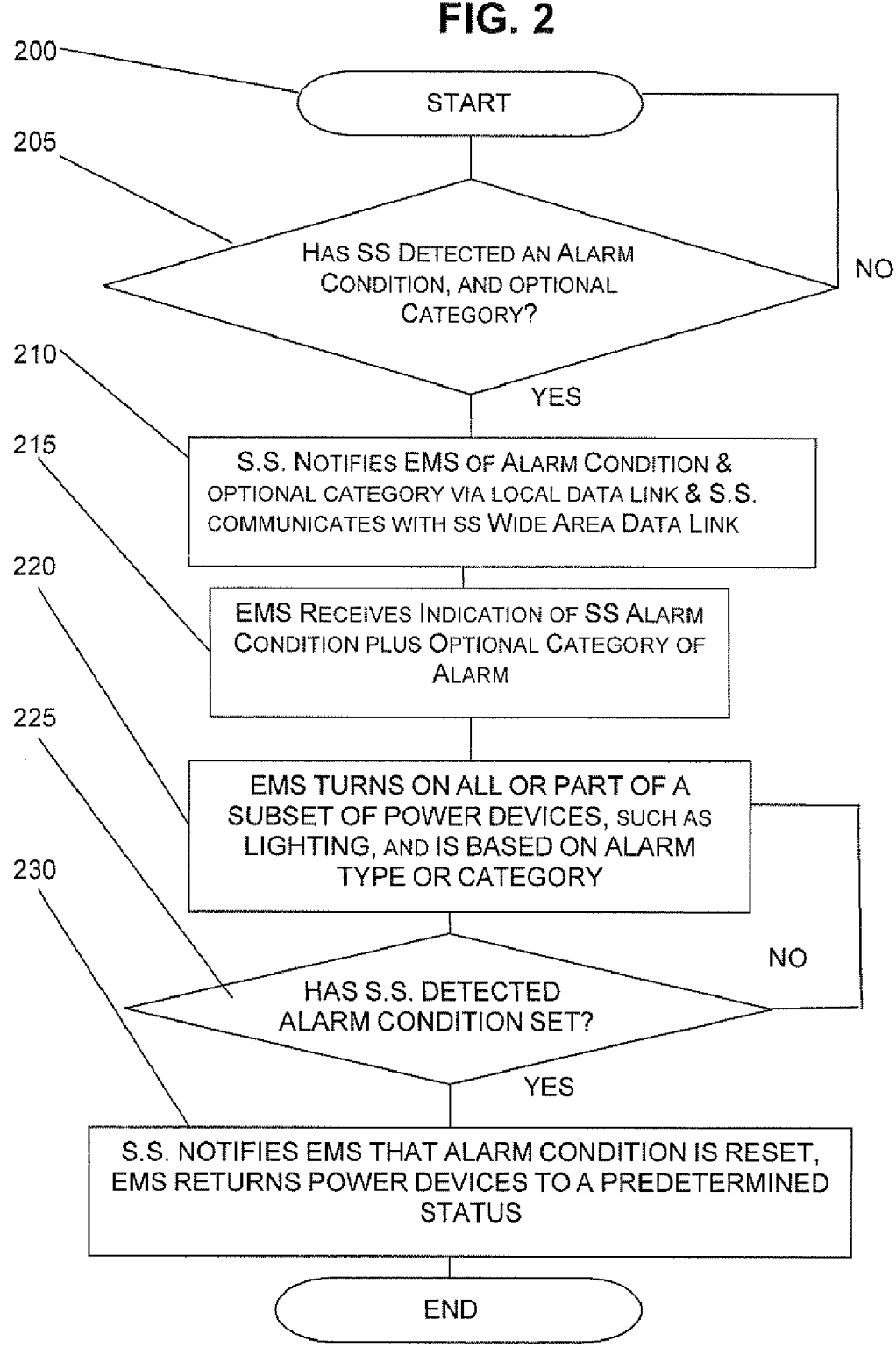
FIG. 2 is a flowchart describing the operational steps of the energy management system (EMS) automatically controlling the building's lights.

FIG. 2 is a flowchart illustrating a method of the invention, and in particular provides one example of how the firmware may operate. An artisan understands and appreciates there are other variations than what is shown and described that lie within the spirit of the invention and the scope of the appended claims. It is also understood that these steps are typically programmed into one or more microprocessors as firmware, or software.

Still referring to FIG. 2, the operation begins at step 200, wherein the security module 25 of SS 20 (shown in FIG. 1) begins its monitoring. At step 205, it is determined whether the SS has detected an alarm condition (and optionally a category or identifier of the condition associated with the detected alarm condition). The SS operation remains relatively unchanged until it has detected the alarm condition. At step 210, the SS (20) notifies the EMS (10) of an alarm condition (and optionally its associated category) over the local dynamic data link (50) (as shown in FIG. 1.) At step 215, the EMS receives an indication from the SS of an Alarm condition plus the category. At step 220, the EMS turns on all or part of a subset of power devices, based on the type of alarm or its category, including but not limited to flashing/blinking lights, possibly turning on additional security cameras, flashing the emergency exit signs, activating sirens, calling police or security, etc.

Continuing to refer to the flowchart in FIG. 2, at step 225 it is determined whether the SS has detected an alarm reset. As the alarms do not report an alarm condition in perpetuity, there would be period of time subsequent to the detection of the alarm condition wherein the alarm would be reset either by police, security, company personnel, or may automatically reset after a certain predetermined time period. Also, the alarm could be reset after reporting over a wide area data link. If there is no alarm reset detected at step 225, then it is back to step 220 and the EMS keeps turned on all or part of a subset of power devices in a way that signifies an alarm condition and/or possibly assists security personnel. For example, if an alarm reset has been detected, which can be caused by many functions, such as the entering of a proper code, use of a special key, or even a timer set to a predetermined period of time, then at step 230 the EMS turns the power devices that were activated in step 220 back to their predetermined states, and the method ends at step 235.

Figure 3:
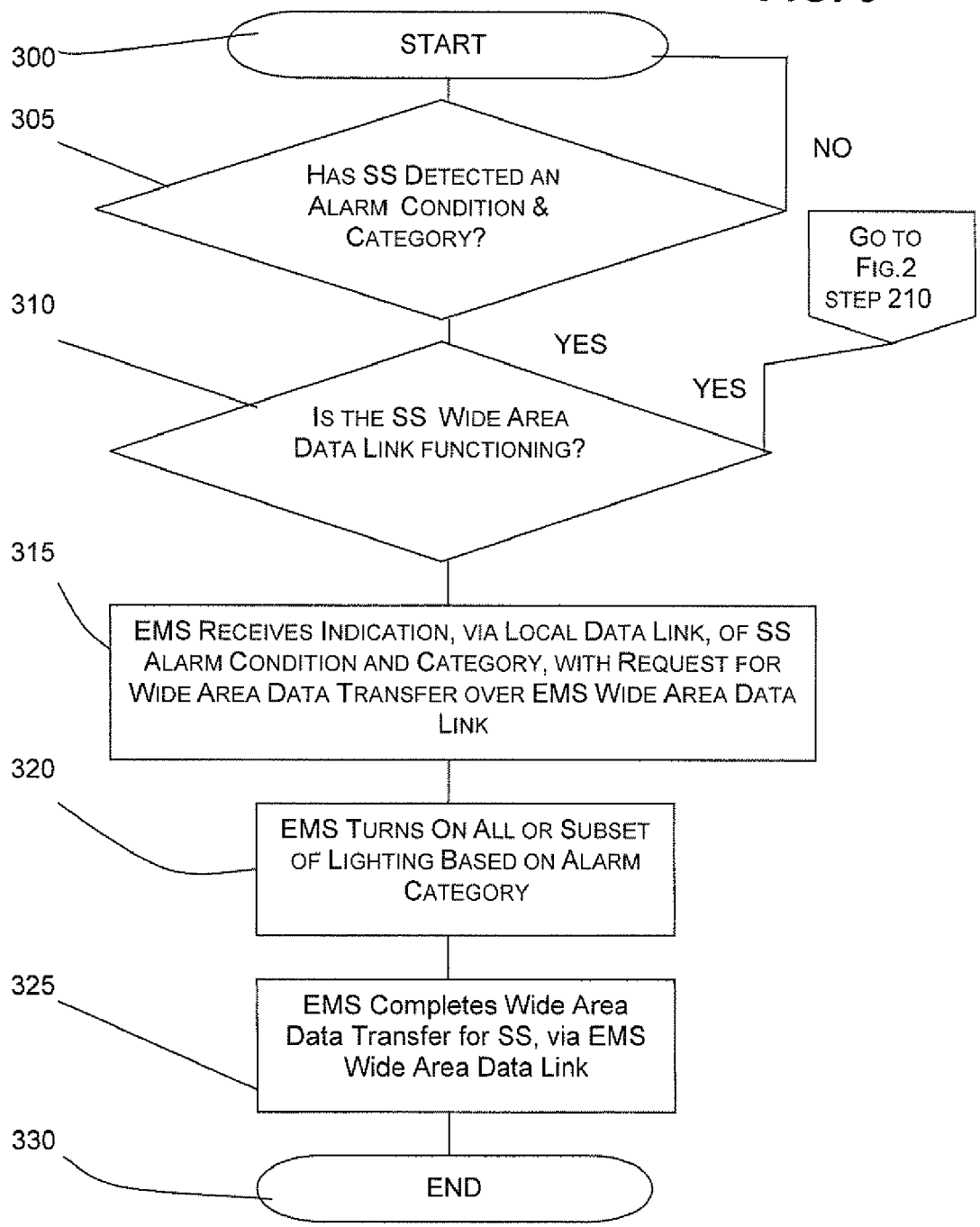
FIG. 3 is another flowchart describing the operation steps of the EMS automatically providing an alternative backup wide area data link.

FIG. 3 is another variation of how the claimed invention may operate. The flowchart in FIG. 3 describes the operational steps of the EMS, which automatically provides an alternative backup wide area data link for SS wide area data link. An artisan understands and appreciates that the operation in FIG. 3 does not show the SS providing an alternative backup wide area data link for the EMS, such function is within the spirit of the invention and the scope of the appended claims.

Still referring to FIG. 3, which starts at step 300, where it is then determined at step 305 whether the SS has detected an alarm condition (and optionally a category of the conditions, e.g. severity codes ranging from 1 to 5). If not, the SS waits until an alarm condition is detected. Once the alarm condition is detected, it is determined whether the SS wide area data link 40 (please see FIG. 1) is functioning. If the link is functioning, the operation then proceeds to step 210 of the flowchart shown in FIG. 2, and the operations are the same in FIG. 2 for the remaining actions.

However, referring again to FIG. 3, if it is determined at step 310 that the SS wide area data link 40 is not functioning (or not functioning properly), then at step 315, the EMS 10 receives an indication via the local dynamic data link 50 of the SS alarm condition and also receives a request for wide area data transfer on behalf of the SS to be sent over the EMS wide area data link.

At step 320, the EMS turns on all or a subset of lighting based on the type of alarm or its identified category. To clarify, the alarms that are detected can be assigned different categories according to severity. For example, a fire would be categorized in one of the most serious categories because of the possibility of loss of life is great. In contrast, for example, loss of power to a heating unit would be of somewhat less significance than a fire alarm. Additionally, the firmware can be adapted to categorize according to severity, for example, that if smoke detectors sense smoke in eight offices, this category of response (and alert) can be higher than if smoke is only detected in one room, albeit still a very serious matter.

Still referring to FIG. 3, now at step 325, the EMS 10 completes the wide area data transfer for the SS 20, via the EMS wide area data link 30 (shown in FIG. 1).

The logic to control the EMS, the SS, and their communication there between for the present invention can be arranged in one or two single units closely spaced within a specific building being monitored.

Figure 5:
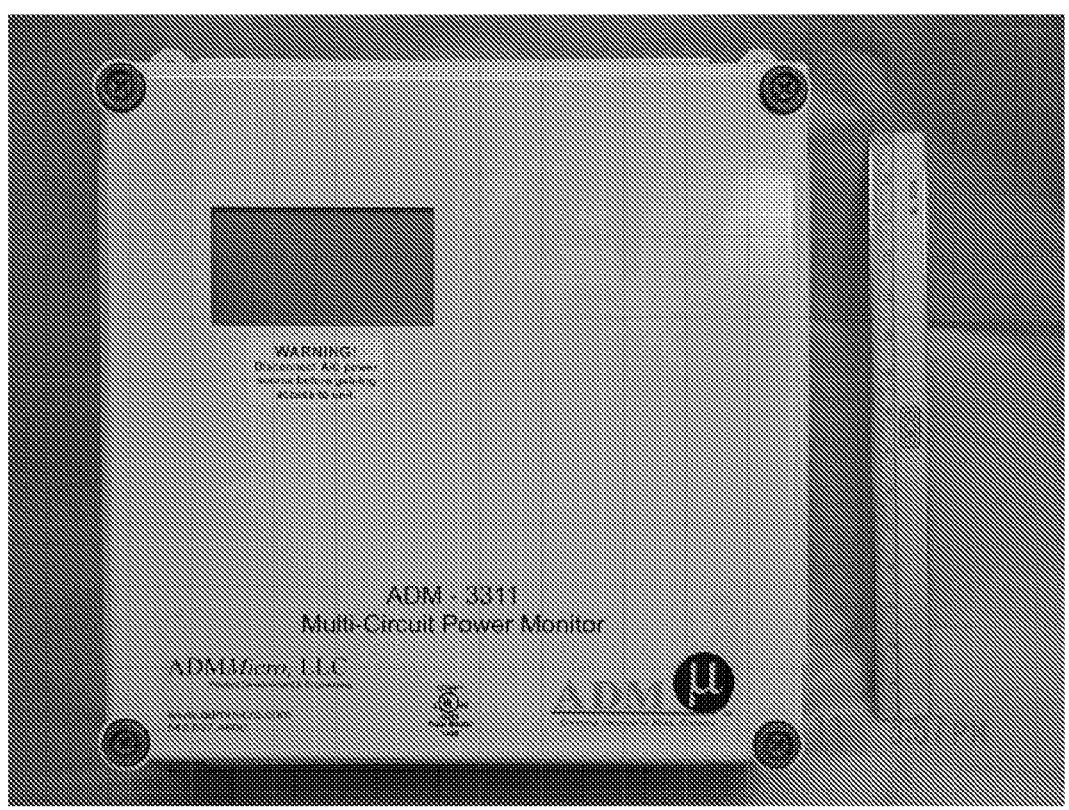
FIGS. 5 and 6 show photographs of an ADM-3311 Multi-Circuit Power Monitor, available from ADMMicro, INC., Roanoke, Va., suitable for containing firmware according to the present invention.
Figure 6:
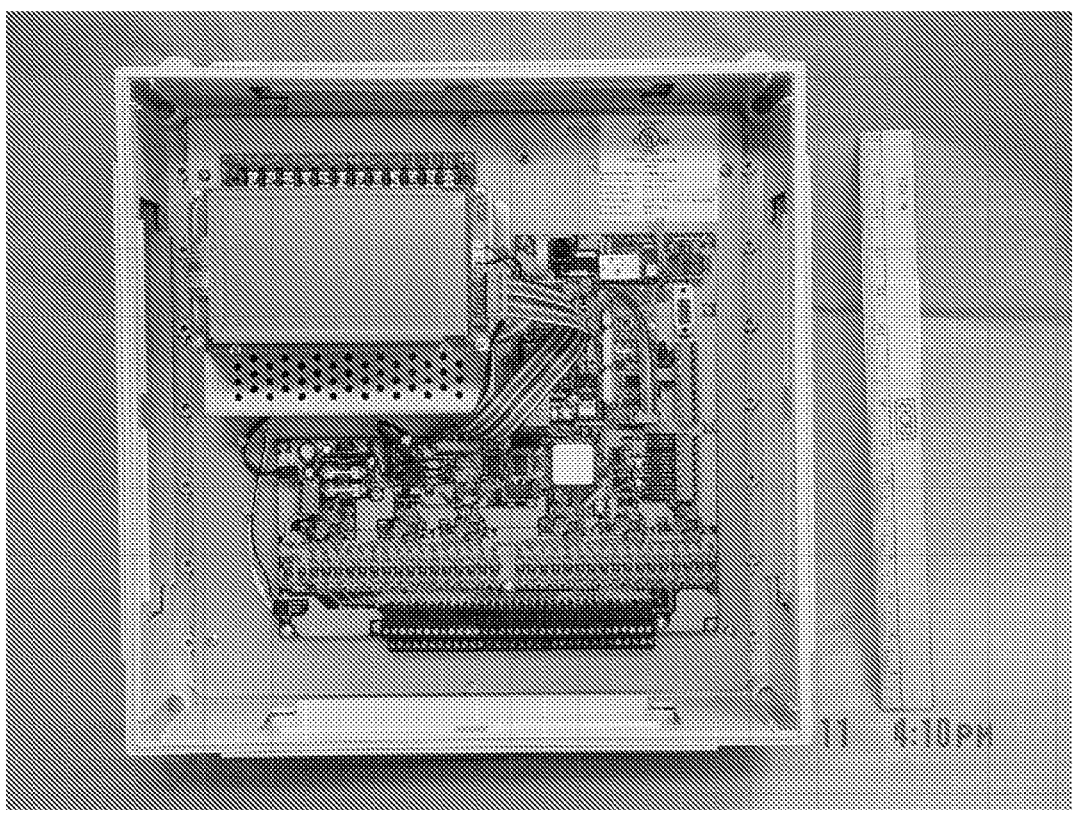
Figure 7:
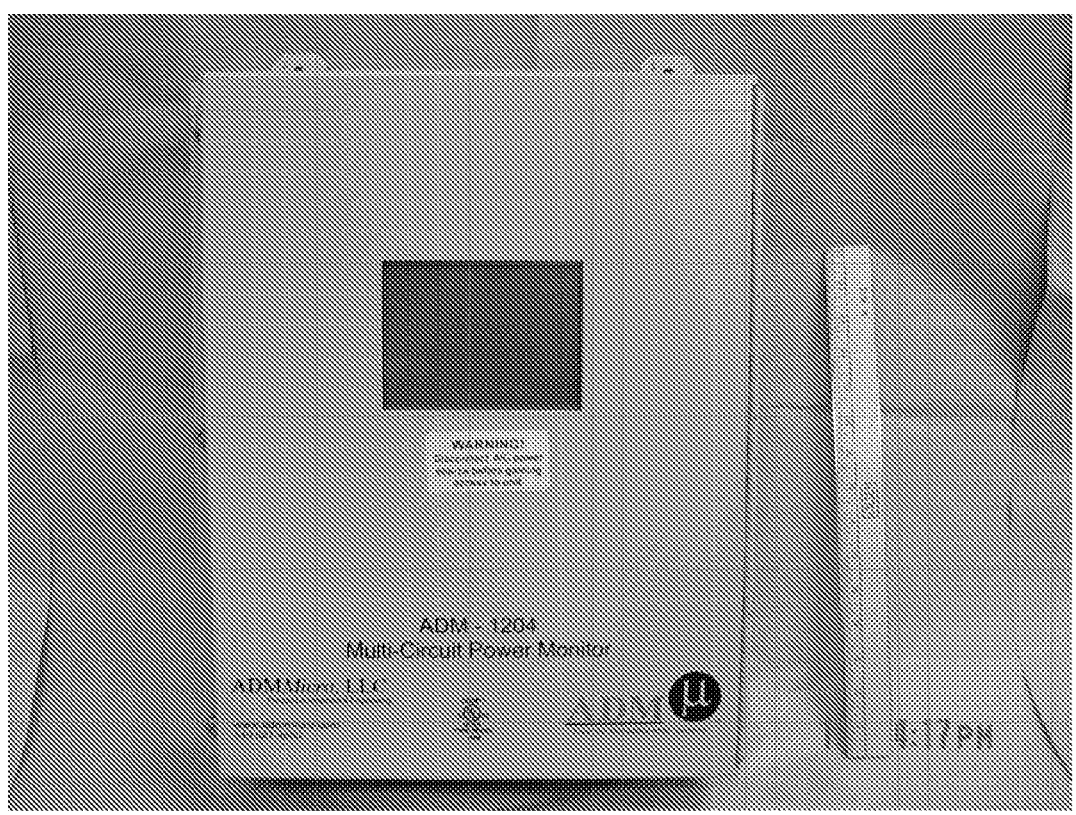
FIGS. 7 and 8 show photographs of an ADM-1204 Multi-Circuit Power Monitor, available from ADMMicro, INC., Roanoke, Va., suitable for containing firmware according to the present invention.
Figure 8:
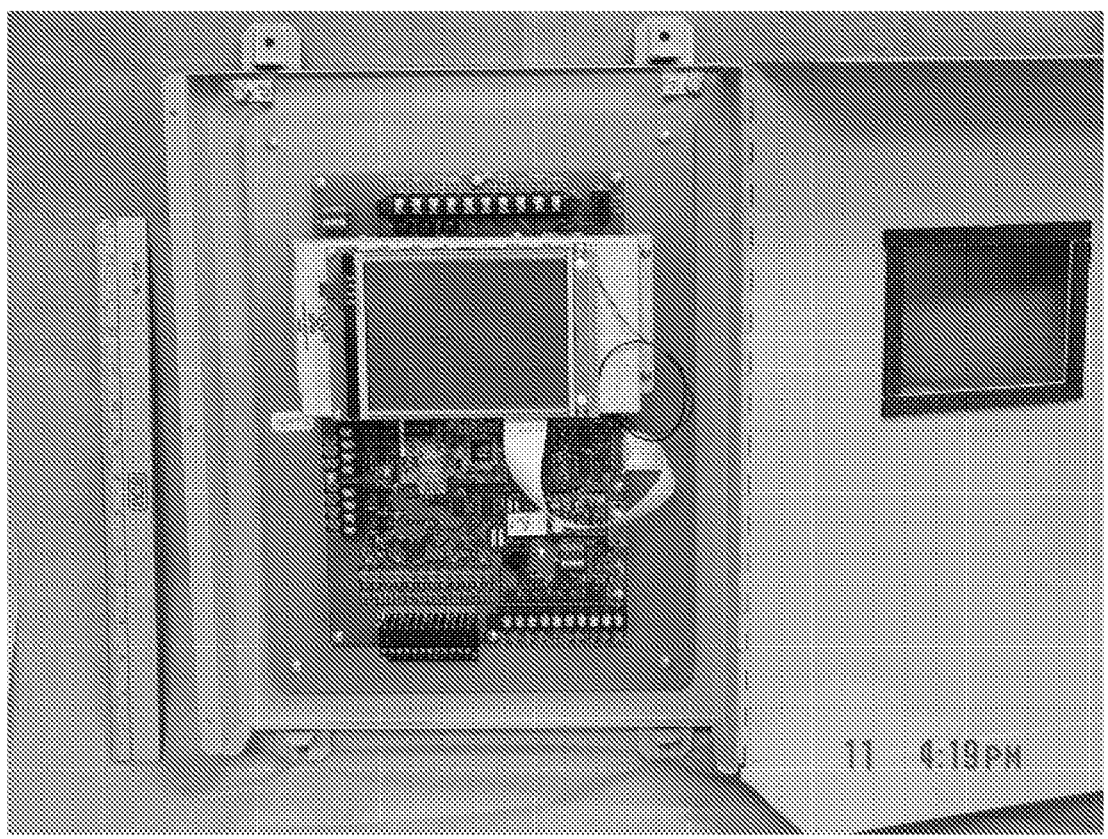

FIGS. 5-8 show photographs of working prototypes of monitor-controller modules suitable for use as part of the EMS portion of the present invention. These monitor-controller modules are variations of an ADM-Multi-Circuit Power Monitor, available from ADMMicro, INC., Roanoke, Va. FIGS. 5 and 6 are photographs of an ADM-3311 Multi-Circuit Power Monitor, available from ADMMicro, INC., Roanoke, Va. FIGS. 7 and 8 show photographs of an ADM-1204 Multi-Circuit Power Monitor, available from ADMMicro, INC., Roanoke, Va., a significantly larger and more capable model than shown in FIGS. 5 and 6. Both models are suitable for containing firmware according to the present invention. The differences between the two models are that some of the capabilities are enhanced, such as the number of loads that can be monitored, types of alarms, items to be controlled, etc.

Figure 4:
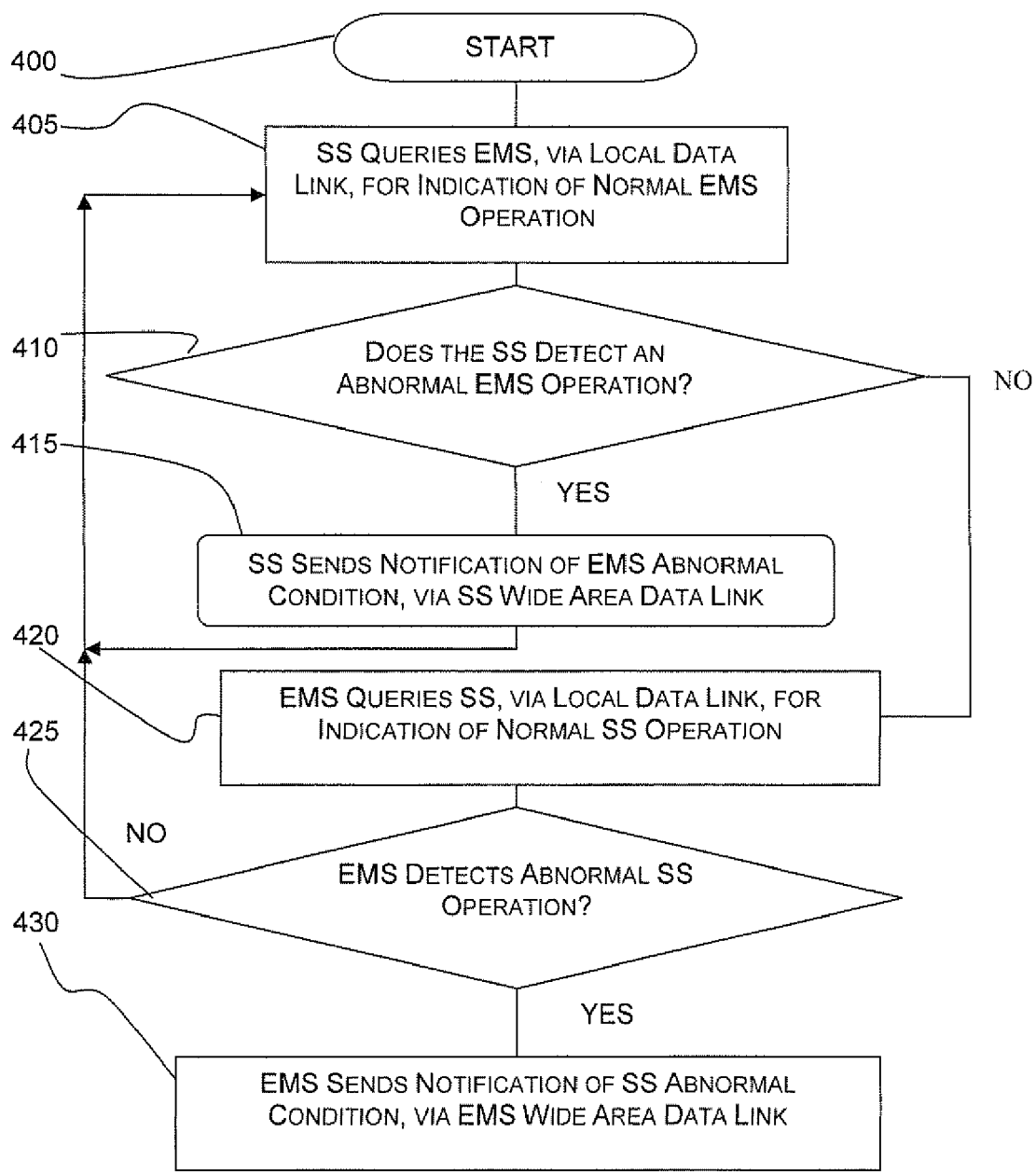
FIG. 4 is a flowchart describing the steps of one way that the EMS and security system (SS) can automatically monitor each other, via the local data link, and provide notification, via the normal wide area data link associated with each system, when the other system is not functioning as expected.

FIG. 4 is yet another flowchart illustrating another variation of the present invention. In this particular variation, the SS and EMS monitor each other via the local dynamic data link, and one can report the status of the other if an abnormal condition is detected.

For example, still referring to FIG. 4, at step 400, the flowchart first begins and at step 405, the SS queries the EMS via the local dynamic data link for an indication of a normal EMS operation. Then at step 410, it is determined whether an abnormal operation of EMS 10 has been detected by the SS 20. If an abnormal operation is detected, then at step 415 the SS 10 sends a notification of a detected EMS abnormal operation. If an abnormal condition is not detected not at step 410, then it jumps to step 420 wherein the EMS 10 queries the SS 20 about any abnormal operations.

At step 425 if the EMS does not detect any abnormal operation of the SS (based on the query), then it is back to step 405 where the SS queries the EMS again. Thus, a type of ringing routine is occurring, with the EMS and SS taking turns monitoring each other. An artisan understands and appreciates that a ping routine could be used between the EMS and SS.

Still referring to FIG. 4 at step 425, it is determined whether the EMS 10 detects abnormal operation of the SS 20, and then the EMS 10 sends notification of the SS abnormality at step 430.

While the physical connection between the EMS and the SS can be wired or wireless, the firmware that controls the communication therebetween can use any open standard or proprietary protocol desired. For example, in the case that an RS-232 cable is used, a communication protocol such as used between two serial devices on a port can be used.

Remote access to a combined monitor/controller for use in the EMS is provided via at least one of a communication line, a wide area network (WAN), and a wired and/or wireless local area network (LAN). The combined monitor/controller typically is a combination of a single controller unit interfaced to a single monitor unit and preferably is a single integrated electrical unit that monitors and controls power loads such as the electrical usage of multiple thermostats and multiple light circuits, all supplied power by a common power source. Based on measured power consumption and at least one predetermined algorithm stored onboard, the monitor/controller of the present invention controls the settings of the plurality of thermostats (when and at what temperatures they turn on and off) as well as turning on/off each of the plurality of light circuits.

To perform monitoring/controlling functions the interfaced control unit or preferably within a single integrated electronic unit preferably performs one or more of the following functions:

Directly monitors at least one electrical load;

Directly monitors at least one environmental variable; Provides a selectable local display of the at least one electrical load;

Provides a selectable local display of the monitored/controlled at least one environmental variable;

Indirectly monitors other energy loads and variables through electronic interfaces with external monitors;

Executes at least one embedded control algorithm to automatically determine a control setting for the at least one electrical loads;

Executes at least one embedded control algorithm to automatically determine a control setting for the at least one environmental variable;

Control algorithms are downloadable and have downloadable parameters for update and tuning;

Indirectly controls at least one energy load through communication with at least one external control device (thermostats, relays, etc.);

Indirectly controls at least one environmental variable through communication with at least one external control device (thermostats, relays, etc.); and Communicates with end-users, computers, and external monitoring and control devices through at least one communication media including Token Ring, Internet, Ethernet, modem, and serial data links. This also includes communicating with a security system according to the present invention.

Thus, the monitor/controller typically provides a single compact electronic device interfacing/integrating robust communications capabilities and management (control) functions for at least one of at least one energy load; and at least one environmental variable.

In one aspect, the monitor/controller typically comprises downloadable software, preferably firmware, containing the at least one control algorithm.

In another aspect, the monitor/controller typically comprises at least multiple analog-to-digital input channels, and optionally comprises at least one of a current input, an optical circuit, an RS-485 output, an RS-232 output, a wireless network interface, and a wired network interface.

In another aspect, the monitor/controller typically comprises a persistent store for retaining historical data for each monitored load and environmental variable. Retention and purging of these historical data can be controlled remotely and these historical data can be locally displayed.

The monitor/controller typically multiplexes subloads at a single site across a maximum power usage (pre-set or algorithmically determined) as well as multiplexes loads across multiple networked sites. Wired and wireless network protocols are supported to provide inter-site and intra-site connectivity as well as to provide remote control of devices using standard messaging such as e-mail.

The monitor/controller takes advantage of the fact that the power supply for the multiple electrical loads normally comes through a few common power distribution panels (such as circuit breaker panels).

Figure 9:
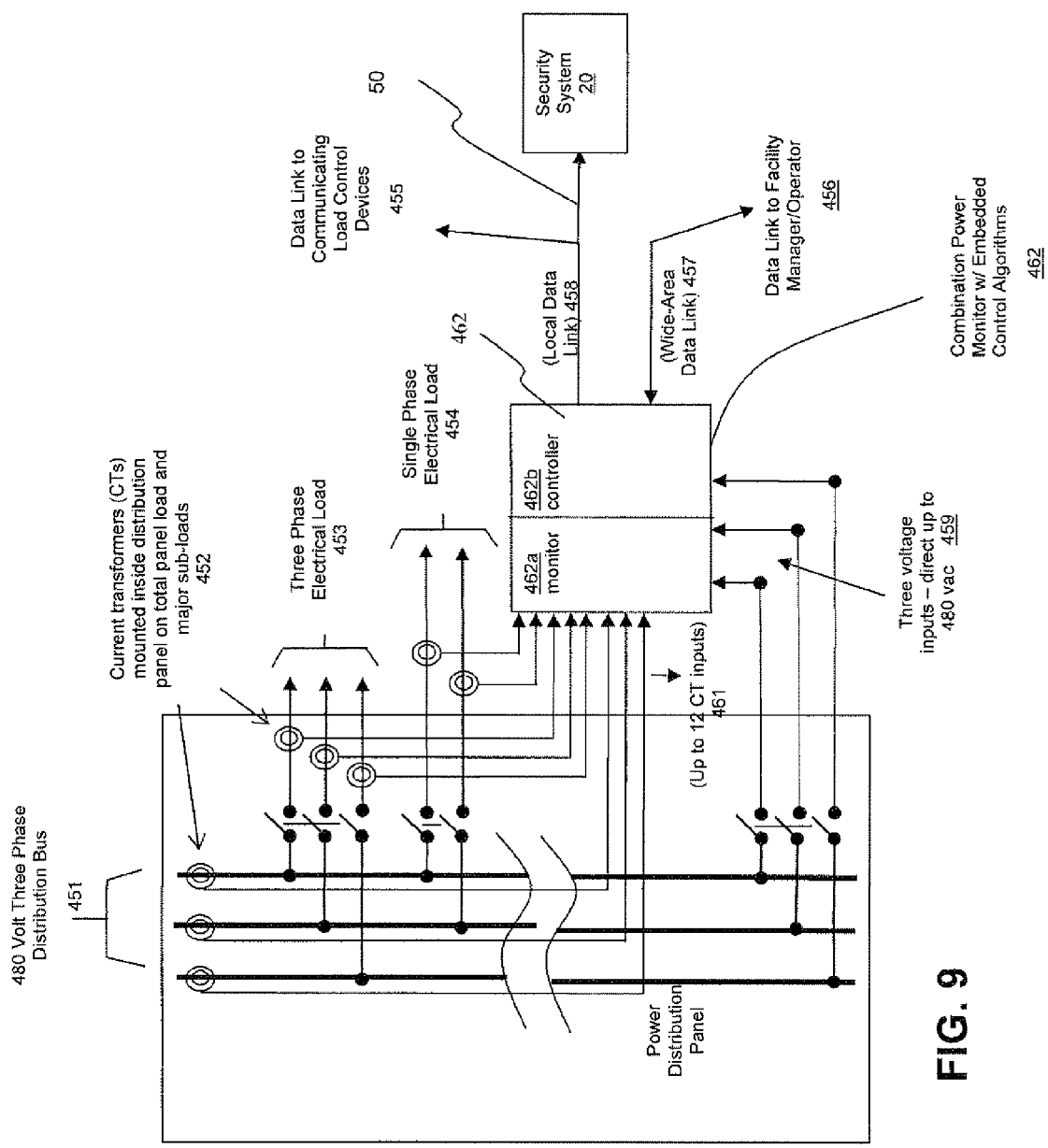
FIG. 9 illustrates an electrical distribution panel diagram configured according with a multi-circuit power monitor of an EMS to control multiple subloads.
Figure 10:
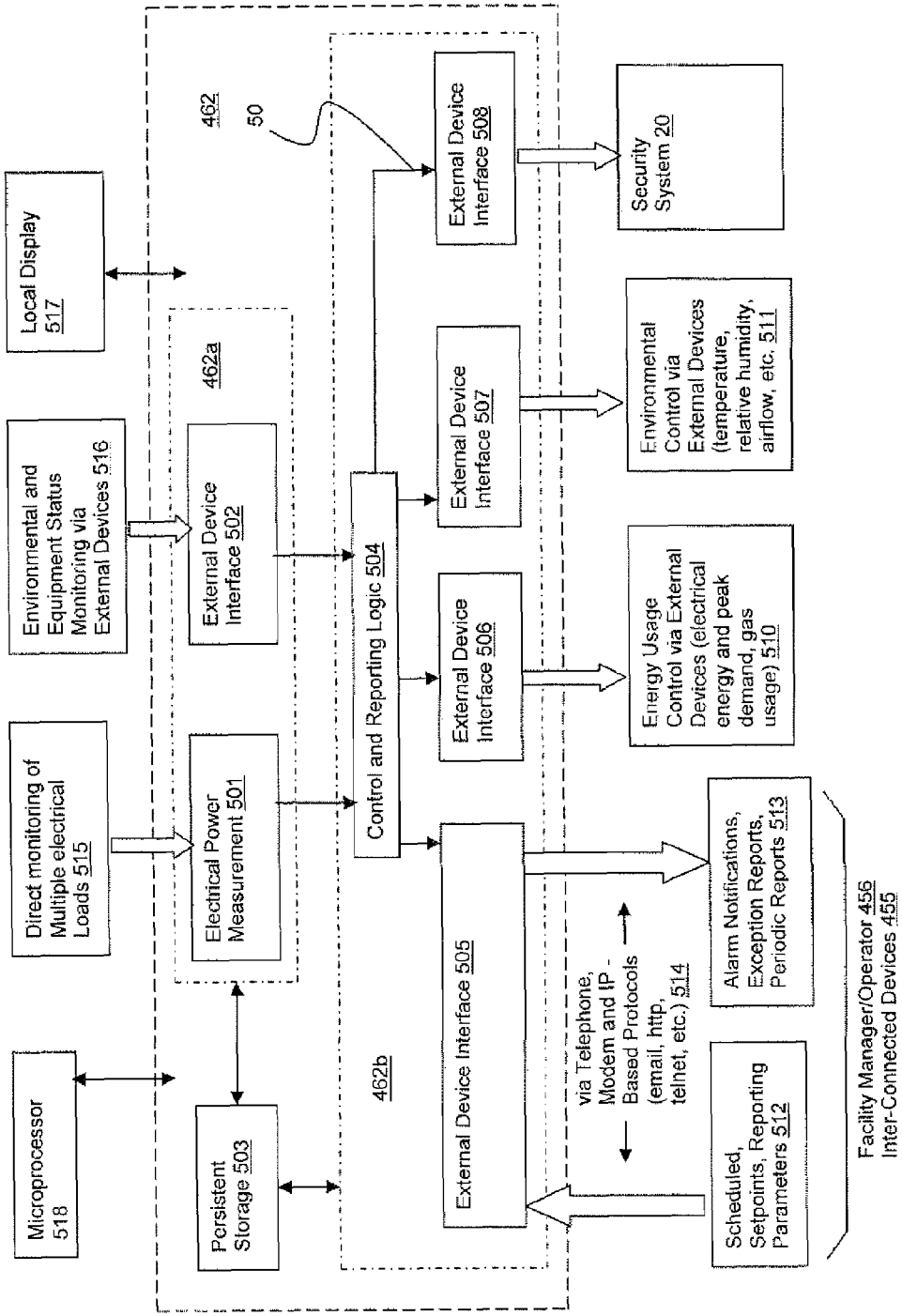
FIG. 10 illustrates the components and interfaces of a tightly integrated combination monitor/controller suitable for use in an EMS.

Referring now to FIGS. 9 and 10, a system with embedded control algorithms, according to a preferred monitor/controller for use in the EMS of the present invention, monitors and controls multiple electrical loads of various configurations 510, 511, 515, 516—including both single 454 and polyphase applications 453. The single monitor/controller 462 is simply wired 459 to common voltages at an electrical distribution panel 460 and can be connected to remote current sensing units 515 to accept power variable measurements. In a preferred embodiment, the monitor/controller 462 of the present invention includes at least one an on-board control algorithm 504 having at least one pre-determined, settable goal. A settable/downloadable threshold is an example of one such goal. The at least one algorithm accepts power 515 and environmental variable 516 measurements as inputs and determines how to control the power consumers 510 and other devices 511 being monitored to achieve at least one goal of the at least one algorithm.

The combined monitor/controller 462 provides advanced sampling, including multiple analog-to-digital converters for fast waveform sampling. All channels (the 12 CT inputs 461 shown in FIG. 9) are an example only and are not limiting in any sense) are sampled simultaneously so that there is no phase delay introduced as in other systems utilizing sequential sampling techniques. Thus, the monitor/controller 462 of the present invention provides ANSI certified accuracies with harmonic capture and analysis capabilities.

In a preferred embodiment, the current inputs 452 (see FIG. 9) are designed with instrumentation amplifiers. Full differential inputs are utilized to achieve the best signal conditions and noise rejection.

In a preferred embodiment, the potential inputs employ optical circuitry to provide high accuracy and isolation. The monitor/controller 462 accepts polyphase inputs including at least one of 120/277 volts (3 phase/4 wire) and 480 volts (3 phase/3 wire) 203. Single phase inputs to 480 volts 459 are acceptable.

In a preferred embodiment, the monitor/controller 462 comprises a plurality of digital inputs and outputs, serial ports and can be configured for a plurality of communication protocols. The plurality of serial ports further comprises at least two RS-485 ports and at least one RS-232 port. The plurality of protocols includes ModBus TCP/IP ASCII/RTU, 514.

In FIG. 9 the monitor/controller 462 communicates via local data link 458 with multiple load control devices 455. Moreover, at least one of the local data links 50 communicates with the security system 20.

Also, a wide area data link 457 communicates facility manager/operator.

In a preferred embodiment, referring now to FIG. 10, the monitor/controller 462 manages HVAC and the at least one algorithm comprises "setback" scheduling 512. Environmental measurements 516 include trending temperatures through at least one of a thermostat and at least one wireless sensor. The at least one algorithm further provides demand control of a plurality of sub-loads. Wireless sensor measurements include ambient, freezer/cooler and HVAC duct temperatures. Monitoring and control variables 516 for HVAC include temperature and humidity. A persistent store 503 is provided for long term storage of measurements (e.g., load profiles) and optionally downloadable firmware/software executed by a microprocessor 518. In an alternative embodiment, the downloadable firmware is stored in a microprocessor 518. Typically, storage comprises at least one of SRAM and flash memory and at least 128 Kb of SRAM and 256 Kb of flash memory is provided.

In a preferred embodiment the monitor/controller 462 is configured to count pulses, sense contact status, and provide output alarming notification 513 on at least one input (pre-determined and downloadable) threshold 512 and the at least one input threshold 512 can be reset from a remote location 455, 456 using the at least one communication media 514.

The communication media 514 provide the monitor/controller 462 with the ability to poll different devices 205, log data and transmit data to other systems under the direction of download able software that is executed by the monitor/controller 462 to capture data, e.g., as input to algorithms executed by the monitor/controller 462. The captured data is maintained on-board for extended periods of time in a persistent store 503 to provide historical load profile data and is remotely retrievable by other devices 455 and a facility manager/operator 456 using any of a plurality of included communication protocols 514.

Control and reporting logic 504 communicates with external device interfaces 505, 506, 507, 508, of which external device interface 508 communicates with the Security System 20.

In a preferred embodiment, referring now to FIG. 10, the monitor/controller 462 can be configured via an embedded Web server, or a PC/laptop running configuration software by a facility manager/operator 456 or by an inter-connected device 455. The configuration can be accomplished via local downloads via an at least one RS-232 port or remotely via downloads using a modem or network 514. Communication features 514 of the monitor/controller 462 include on-board Ethernet, embedded Web server, Embedded e-mail client, at least one serial data port, on-board modem, Modbus/485 and Modbus/IP, Xmodem file transfer.

In a preferred embodiment, a local display, that is preferably a touch screen 517, provides local viewing of at least one of energy data, waveforms, and configuration parameters.

The system and method of the present invention thus supports on-board advanced control algorithms for energy management, e.g., demand control, and provides interfaces to load control devices such as communicating thermostats.

Figure 11A:
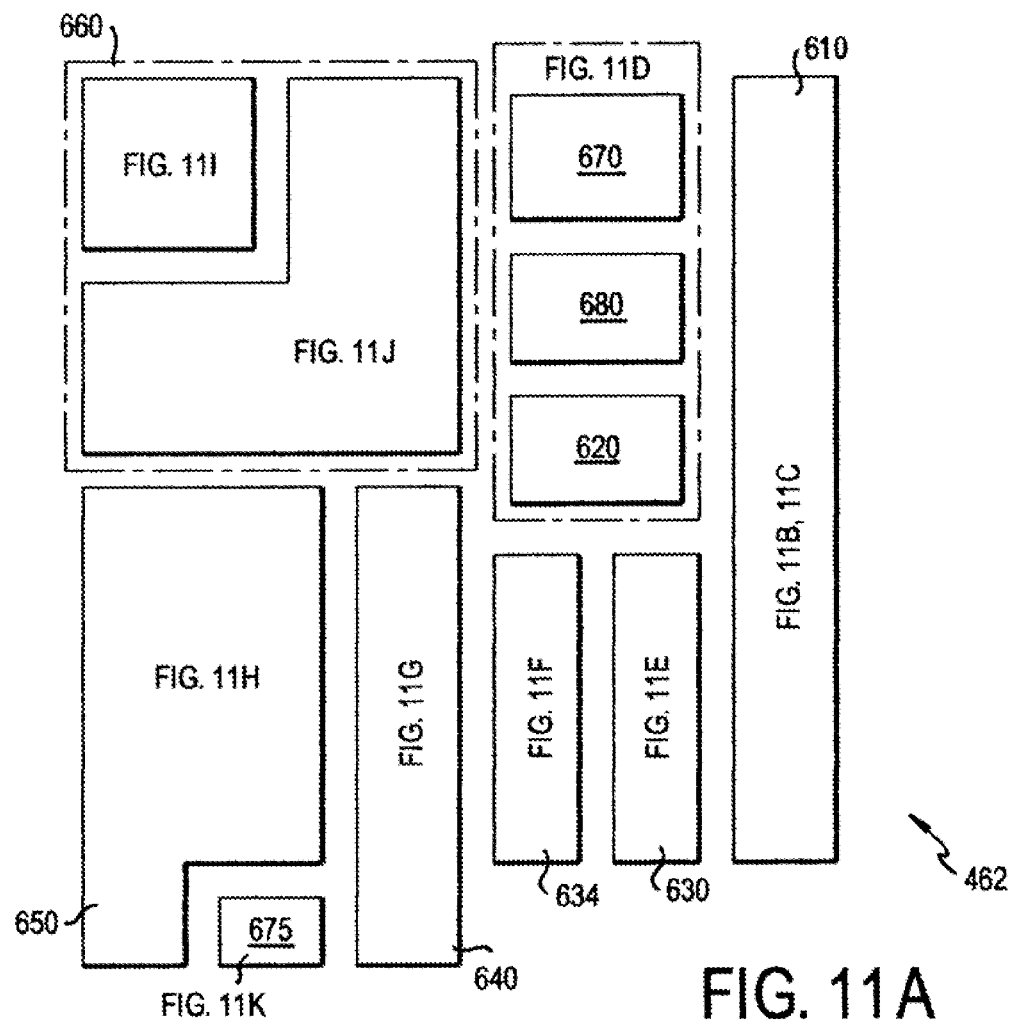
FIG. 11A illustrates a schematic diagram of a preferred embodiment of the combination monitor-controller for use in an EMS.

FIG. 11A illustrates a schematic diagram of a preferred embodiment of the combination monitor-controller 462 for use in an EMS. The monitor-controller is used as part of a system and method to provide measurement and control capabilities for monitoring and controlling a plurality of single phase and poly-phase electrical loads. The power management device includes a monitor module that directly monitors energy usage of at least one energy load to generate at least one measurement of energy usage by the at least one energy load, and a control module operatively coupled to the monitor module to control energy usage by the at least one energy load in a pre-determined manner that is based on the at least one measurement of energy usage, wherein the control module controls the at least one energy load via a data link.

The monitor/controller 462 includes a current monitoring interface 610, a voltage monitoring interface 620, an analog-to-digital (A/D) converter 630, a high voltage opto-isolator 640, a data flow controller 650, a remote communication interface 660, local control interfaces 670 and 675, and a direct current (dc) power supply 680. Together, these components, in cooperation with external devices, provide a capability to monitor and manage the energy supplied to loads by multiple power circuits.

Current monitoring interface 610 provides a twelve-channel interface between the power circuits being monitored and electrical A/D converter 630. Each of the twelve channels is connected to a separate power circuit to monitor the flow of current through the circuit. The connection is made with a current tap at both a supply (i.e., hot) line and a return (i.e., neutral) line of the power circuit using a current transformer. Each current tap provides a waveform signal that is representative of the current flow at the tap point. Together, the supply and return line waveforms of the power circuit provide a differential signal pair representing the current flow through the power circuit and this pair is provided to one channel of current monitoring interface 610. Use of the differential signal waveform is preferred to the use of either one of the individual waveform signals because the individual waveform signals usually have the same noise components superimposed on them and these noise components can be largely eliminated by measuring the differential amplitude between the two individual waveforms.

For each of the monitored power circuits, the corresponding supply and return waveform signals are filtered and impedance buffered by a respective low-pass filter 612A-612L (FIGS. 11B and 11C). Thereafter, each of the filtered and buffered differential signal pairs is provided to a separate one of twelve corresponding channels of A/D converter 630. Accordingly, each one of the twelve A/D converter channels has first and second inputs that respectively receive the filtered and buffered supply and return line waveform signals of the differential signal pair corresponding to one of the twelve power circuits being monitored.

Voltage monitoring interface 620 provides a three-phase interface to a power line supplying power to each of the power circuits being monitored. For each phase of the power line, a voltage tap is provided to communicate a voltage waveform, representing the voltage changes occurring on the phase, to a separate one of three low-pass filters 622. Low-pass filters 622 filter and impedance buffer their respectively received phase voltage waveforms. Thereafter, each of the filtered and buffered phase voltage waveforms is provided to a separate channel of A/D converter 630.

A/D converter 630 has three sample and hold (S/H) A/D converters (S/H converters) 632-634. Each of S/H converters 632-634 is capable of simultaneously determining six differential analog values and converting these analog values to a digital representation of these values. Each differential value is determined by the amplitude difference between two analog signals provided to the inputs of a channel of S/H converter 632-634. As each of S/H converters 632-634 has six individual channels, a combined total of eighteen differential analog values can be simultaneously determined and converted to digital representations by A/D converter 630.

Each of the twelve differential signal pairs provided by current monitoring interface 610 is provided to a separate channel of S/H converters 632 and 633. S/H converters 632 and 633 generate digital representations of the waveform differences existing at the pair of current taps for each of the twelve power circuits monitored.

S/H converter 634 receives each of the three phase voltage waveforms provided by voltage monitoring interface 620 at a separate channel and determines a difference between each phase voltage waveform and a reference waveform. The determined difference for each channel is converted to a digital representation that reflects the voltage detected at the corresponding phase tap.

More specifically, S/H converters 632 and 633 receive the filtered and impedance buffered differential signal pairs, representing the supply and return current waveforms, for each of the twelve power circuits interfaced to monitor/controller 212 by current monitoring interface 610. For each of their respective six channels, S/H converters 632 and 633 detect the analog amplitude difference between the channel's corresponding pair of differential signals and convert this difference to a digital value representing the difference. S/H converters 632 and 633 perform this detection and conversion process repeatedly so that the sequence of digital values produced for each channel provides a representation of the current flow through the corresponding power circuit.

Similarly, S/H converter 634 receives the filtered and impedance buffered phase voltage waveforms representing the voltage waveforms of the three-phase power line. S/H converter 634 detects the analog amplitude difference of each phase voltage waveform, with respect to a reference waveform, at a point in time and converts this amplitude difference to a digital representation of the difference. S/H converter 634 performs this detection and conversion process repeatedly so that the sequence of digital values produced for each channel provides a representation of the voltage waveform at the corresponding phase of the power line.

High voltage opto-isolator 640 receives and buffers the digital values produced by S/H converter 634 and communicates the buffered digital values as data to other components of monitor/controller 212, through optically-coupled data line drivers 642. The electrical signal isolation provided by line drivers 642 is desirable for electrically isolating monitor/controller 212's low-voltage components, which receive the digital data representing the phase voltage waveforms, from the components that may directly or indirectly receive the high voltage present at the phase taps of the high voltage (e.g., 480 VAC) power line.

Data flow controller 650 controls the flow of specific data and control signals among the components of monitor/controller 212 and between these components and external devices. This control is provided by an address decoder 652 and several bus buffers/line drivers 654. Address decoder 652 decodes a three-bit encoded value provided by an address bus and selects one of eight prospective addresses identified by the encoded value. The selected address is communicated internally within monitor/controller 212 and externally, as necessary, to control the flow of specific data and control signals within monitor/controller 462. Bus buffers/line drivers 654 cooperate with address decoder 652 and other components of monitor/controller 462 to receive or transmit the specific data and control signals.

External devices (illustrated in FIG. 10) that communicate data or control signals to components of monitor/controller 462 may include a touchscreen device 517, a microprocessor 518, a communication modem 514, and environmental monitoring and control devices 511, 516, as well as the security system 20. The optional touchscreen device 517 displays specific data and control signals communicated through monitor/controller 462 and conveys user commands to monitor/controller 462. The microprocessor 518 provides the processing capability to determine operational characteristics of the monitored power line and each of the monitored power circuits, based on the data generated by A/D converter 630. Additionally, the microprocessor 518 provides general control and communication functionality for monitor/controller 462 and the external devices to which it is connected. The communication modem 514 supports communication between the microprocessor 518 and remotely located devices. The environmental monitoring and control devices 511, 516 monitor and control environmental systems that may affect the operational characteristics of the power line or its associated power circuits.

Remote communication interface 660 provides an interface for modem, RS-232, and RS-485 communications between external devices that are connected to monitor/controller 462. RS-485 transceivers 662 and 663 receive and drive communication signals in accordance with RS-485 specifications. Similarly, RS-232 transceiver 664 receives and drives communication signals in accordance with RS-232 specifications. Octal buffer/line drivers 665 and 666 buffer and drive specific data and control signals conveyed through communication section 660.

Local control interface 670 provides an opto-isolated communication interface between local environmental devices and monitor/controller 462. Local control interface 685 provides a 5 Vdc switched output to an external device and is preferably used to operate a display light of the touchscreen device 517.

Power supply 680 receives energy from an alternating current source and converts this energy for provision within monitor/controller 462 by regulated 5 Vdc and 3.3 Vdc sources.

FIGS. 11B and 11C illustrate enlarged views of a current monitoring interface of the combination monitor-controller illustrated in FIG. 6A.

Figure 11K:
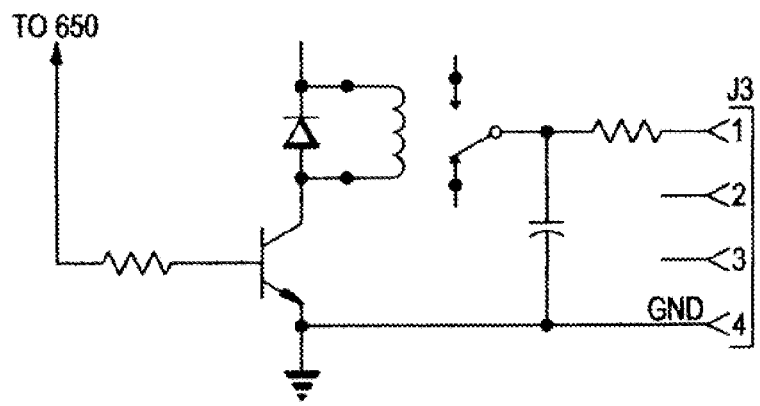
FIG. 11K illustrates an enlarged view of the portion of a circuit that supplies a data flow to controller 650 in FIG. 11H.
Figure 11D:
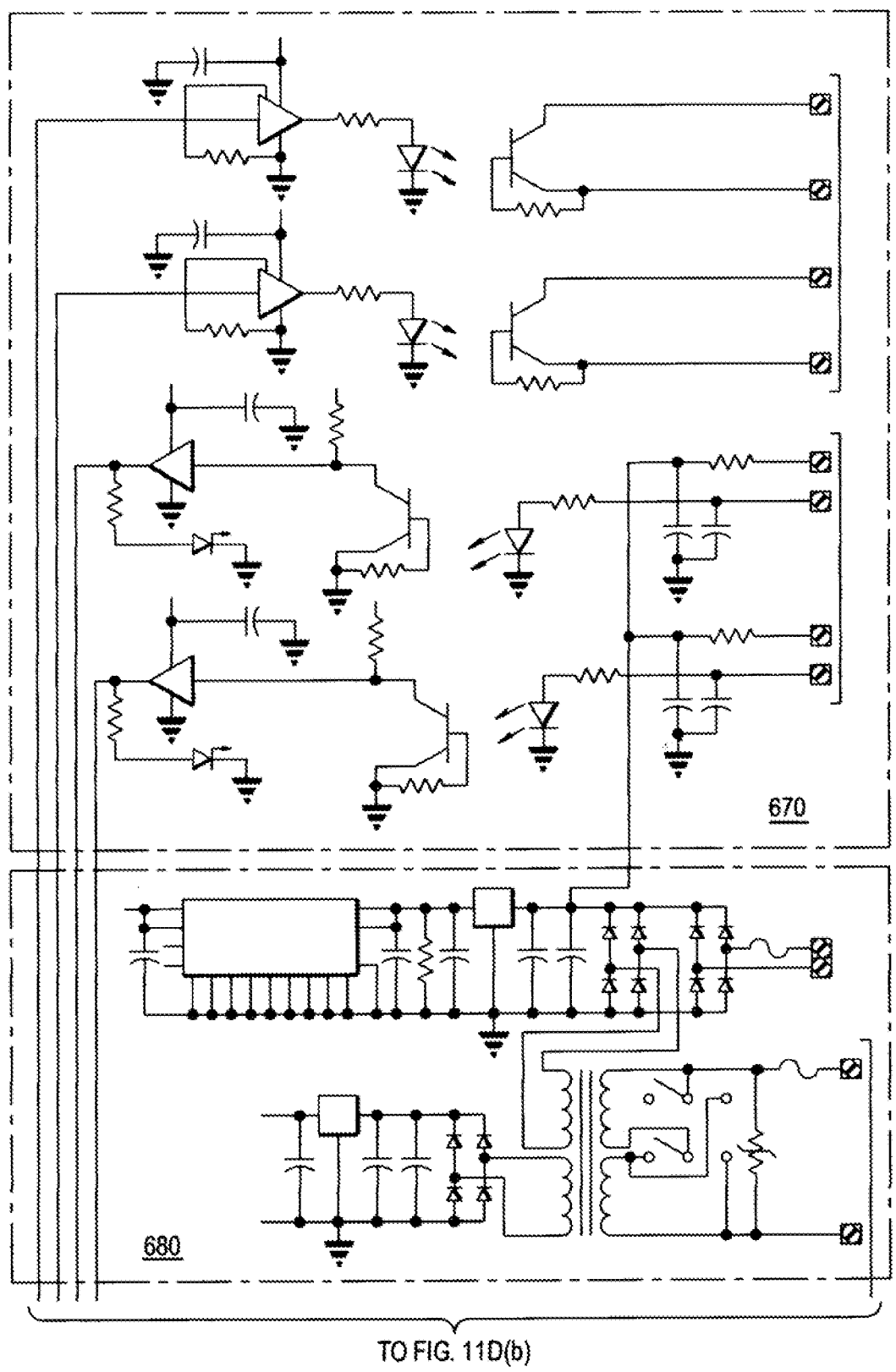
FIGS. 11D(a) and 11D(b) together illustrate an enlarged view of a local control interface, a direct current power supply, and a voltage monitoring interface, elements 670, 680 and 620, respectively, of the combination monitor-controller illustrated in FIG. 11A.
Figure 11D:
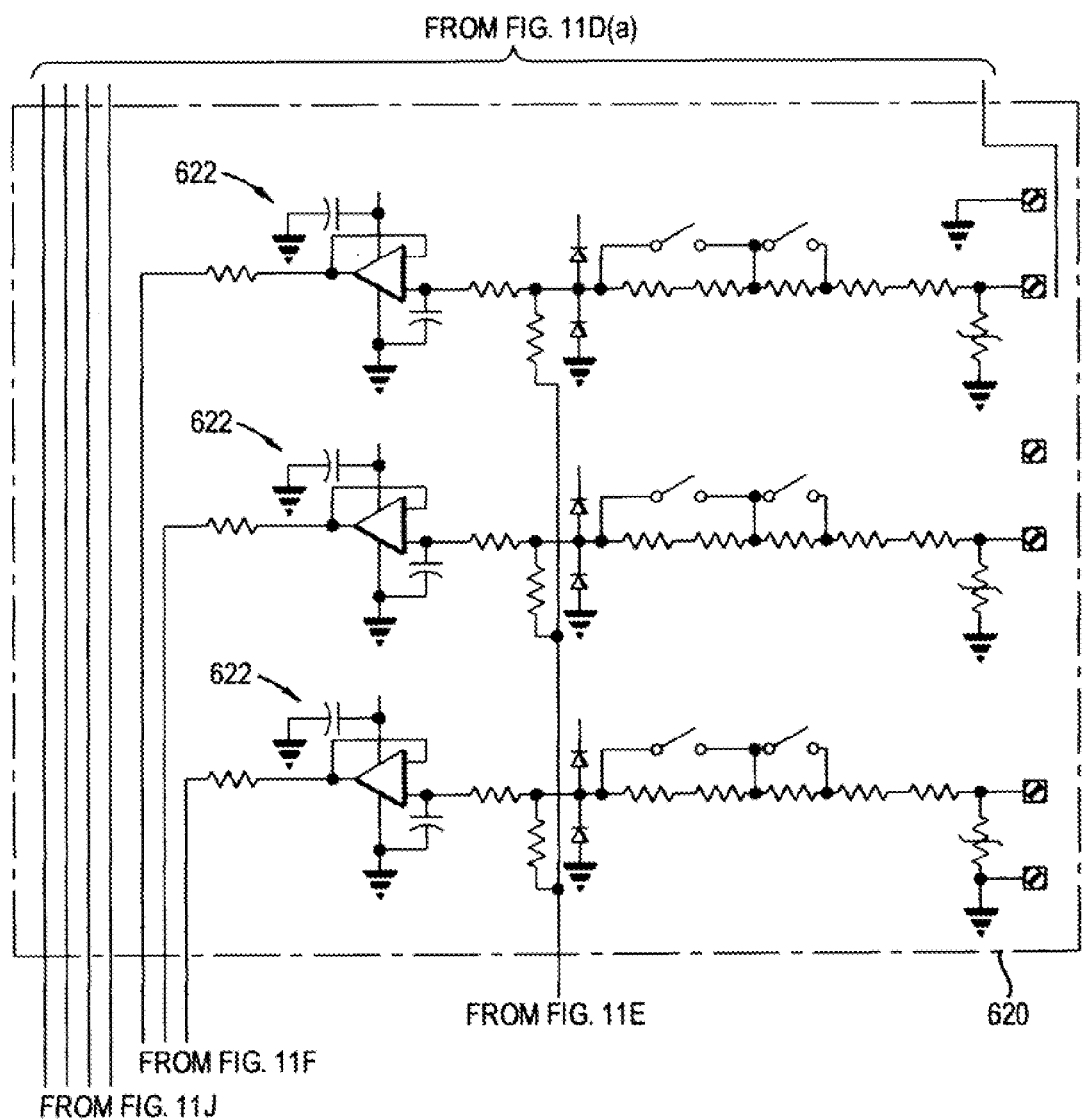

FIGS. 11D(a) and 11D(b) together illustrate an enlarged view of a local control interface, a direct current power supply, and a voltage monitoring interface, elements 670, 680 and 620, respectively, of the combination monitor-controller illustrated in FIG. 11A.

Figure 11E:
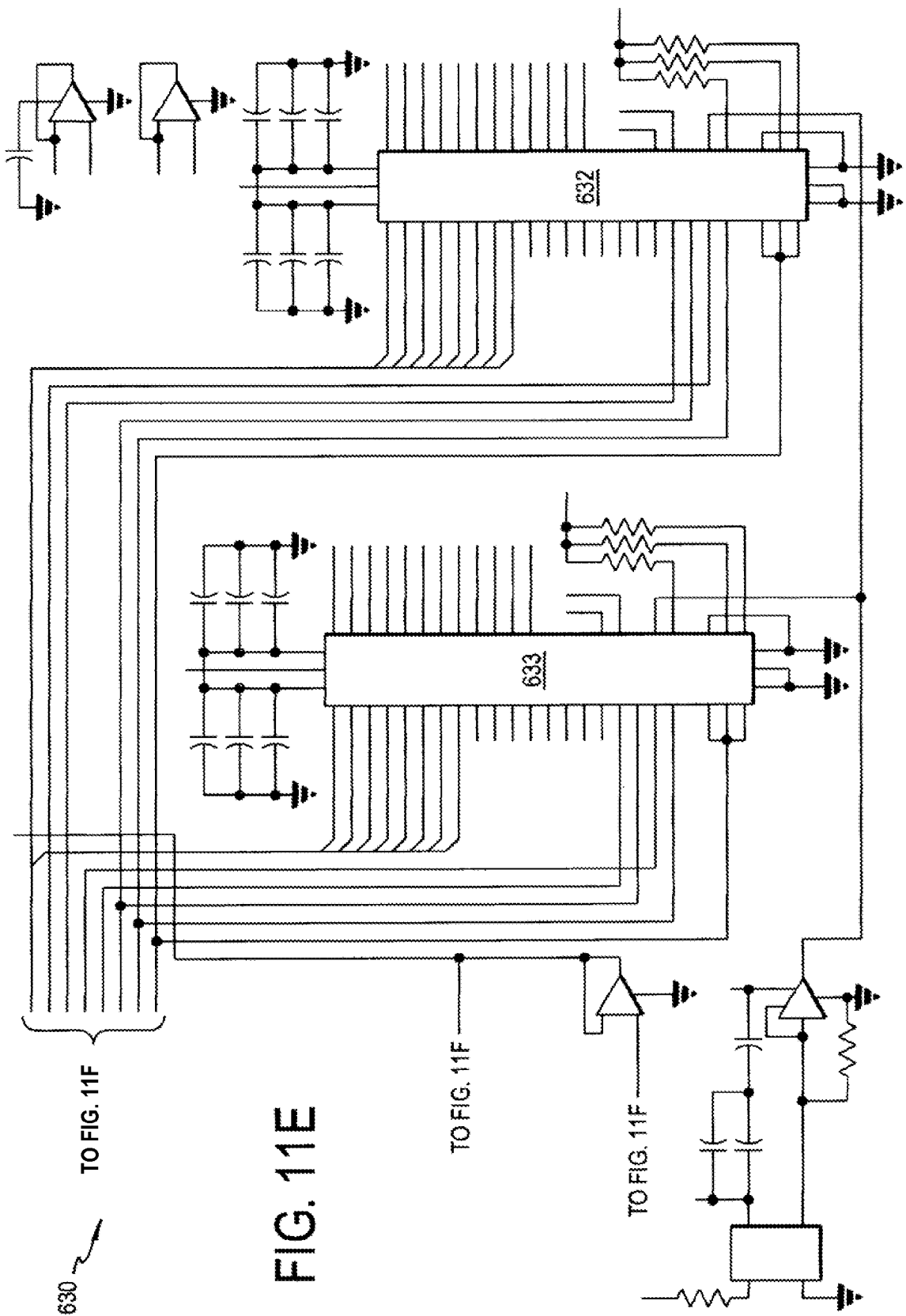

FIGS. 11E and 11F illustrate enlarged views of an analog-to-digital converter of the combination monitor-controller illustrated in FIG. 11A.

Figure 11G:
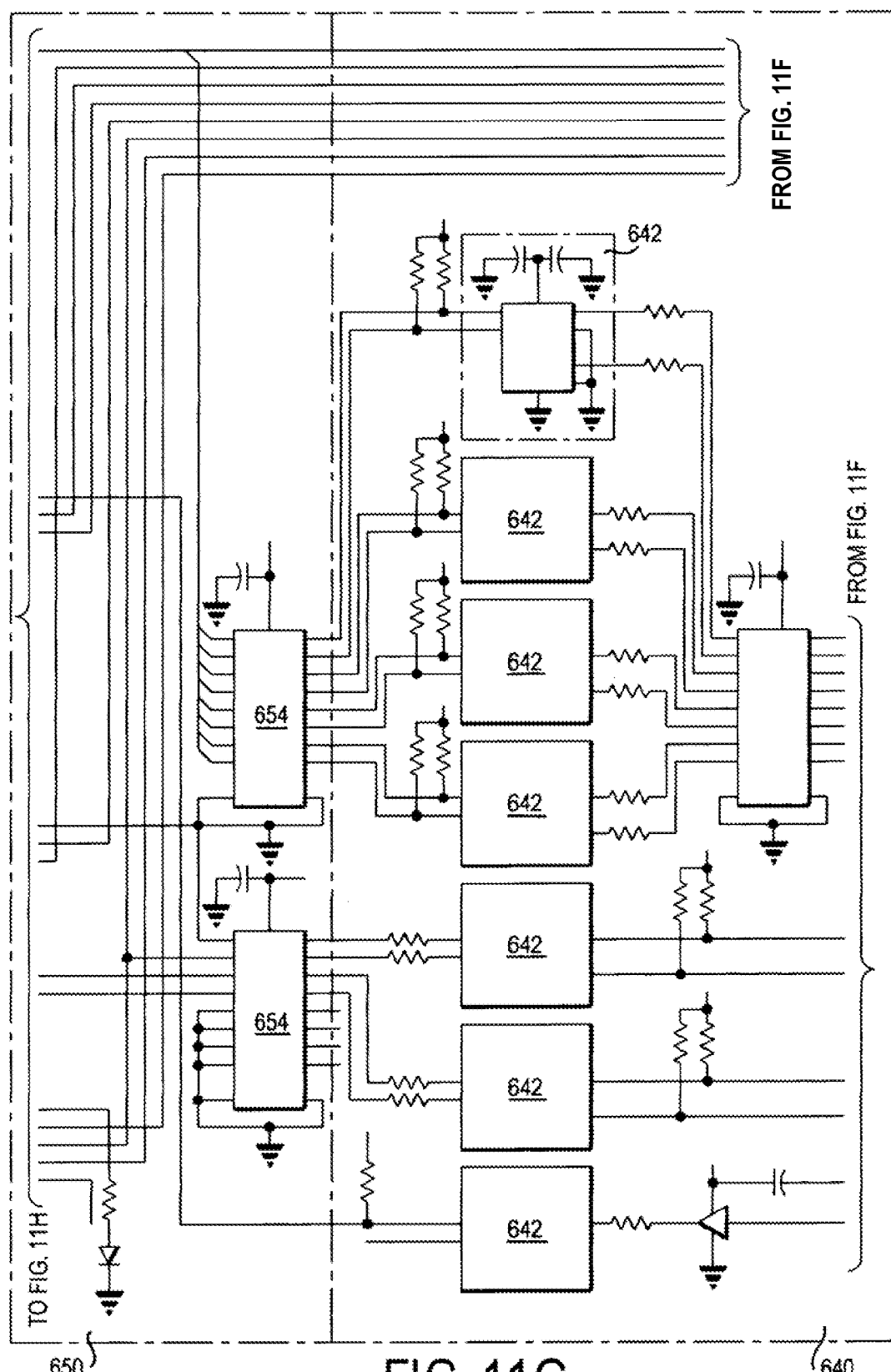
FIG. 11G illustrates an enlarged view of a high voltage opto-isolator and a portion of a data flow controller of the combination monitor-controller illustrated in FIG. 11A.

FIG. 11G illustrates an enlarged view of a high voltage opto-isolator and a portion of a data flow controller of the combination monitor-controller illustrated in FIG. 11A.

Figure 11H:
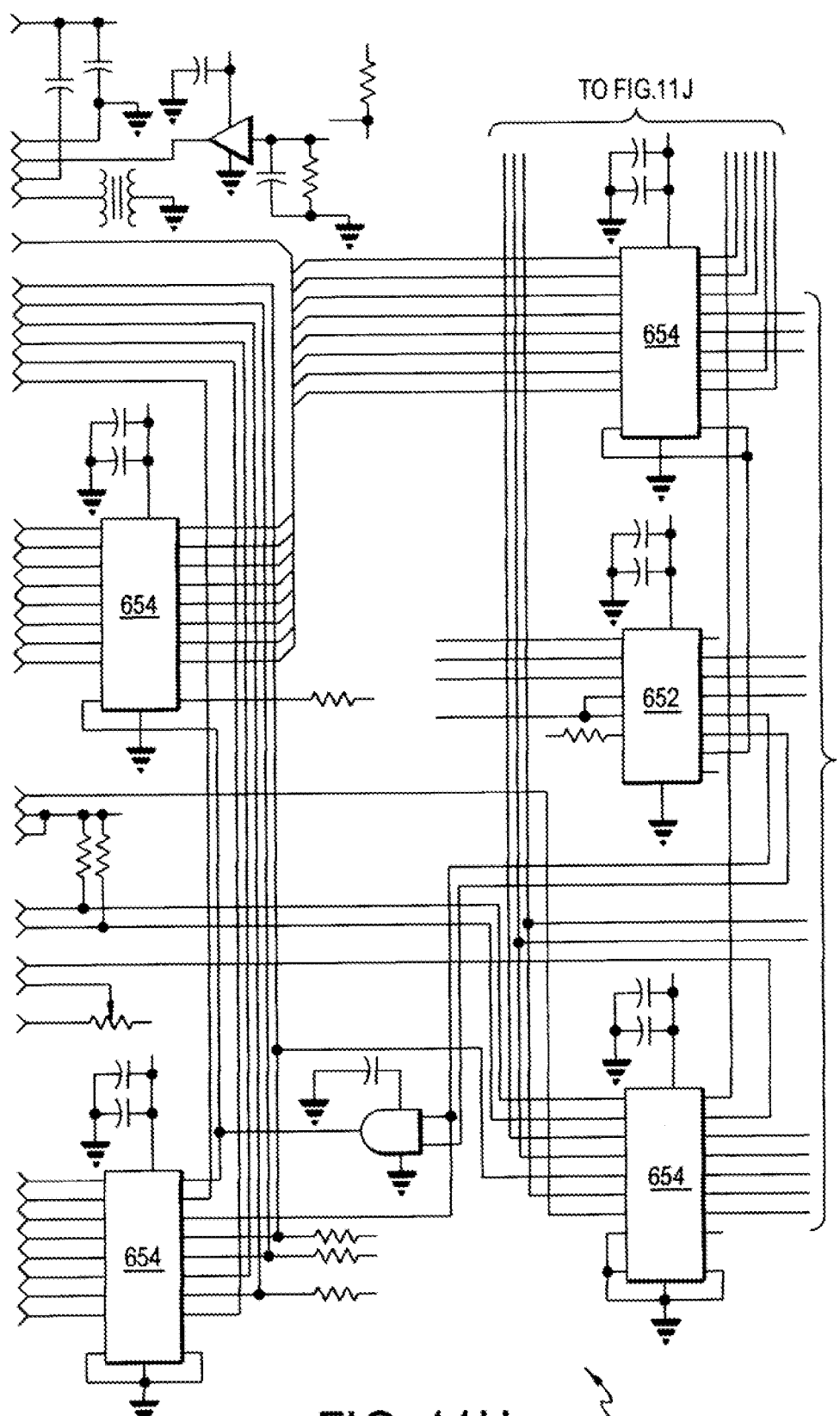
FIG. 11H illustrates an enlarged view of the portion of the data flow controller not illustrated in FIG. 11G.

FIG. 11H illustrates an enlarged view of the portion of the data flow controller 650 not illustrated in FIG. 11G.

Figure 11J:
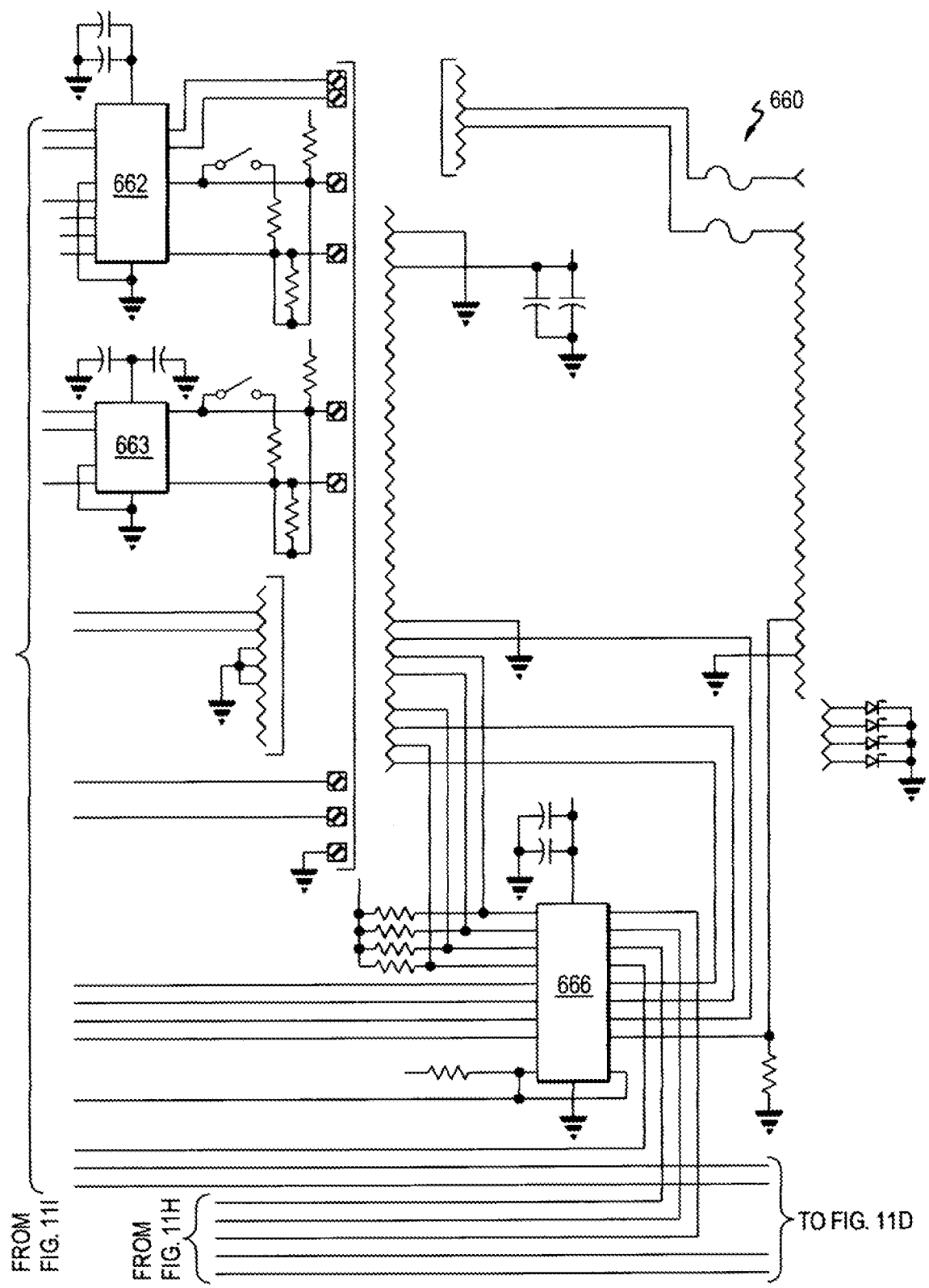

FIGS. 11I and 11J illustrate enlarged views of a remote communication interface of the combination monitor-controller illustrated in FIG. 11A.

FIG. 11K illustrates an enlarged view of the portion 675 of a circuit that supplies a data flow to controller 650 in FIG. 11H.

Onboard Algorithms

The following algorithms comprise the embedded control algorithms for power monitoring and power control aspects of each power monitor and management device 462. These algorithms are presented for discussion only and not in any limiting sense. They are examples only of the types of typical embedded algorithms suited for monitoring and control but one skilled in the art will appreciate that the present invention is not limited to the following algorithm example discussions.

1. Waveform Sampling and Power Calculations

In a preferred embodiment, all voltage (×3) and current (×12 or ×33) waveforms are simultaneously and continuously sampled to collect and store a plurality of M samples (M typically is 64) over one full power grid sinusoidal waveform cycle (typically a time period of 16.67 milliseconds for a 60 Hz power system). Voltage waveforms are then additionally sampled to collect a total of N samples (N typically is 80) over one plus X sinusoidal waveform cycles (X typically is ¼). Various electrical power data values are then calculated using the previously collected samples as follows:

1.1 Calculated per cycle RMS (root mean squared) un-scaled values:
   1.1.1. Voltage phase to neutral (×3)
   1.1.2. Voltage phase to phase (×3)
   1.1.3. Per phase load current (×12 or ×33)
   1.1.4. Per phase real power (watts—×12 or ×33)
   1.1.5. Per phase reactive power (vars—×12 or ×33). Reactive power is calculated using voltage and current samples that are offset in time by the equivalent of 90 degrees phase angle, thus the need for additional voltage waveform samples (80 versus 64).

The above sampling and calculation process is repeated at least K times per second (K typically is 7), with the results of each repetition used to derive one second average values.

A one second average derived from the above per cycle RMS values are scaled to appropriate engineering units and used to further derive one second values for per phase apparent power (VA) and per phase power factor (PF), resulting in the following;

1.2 Calculated one second RMS scaled values:
   1.2.1 All above per cycle values
   1.2.2 Virtual load real power (virtual=summations of 1.1.4 above)
   1.2.3 Virtual load reactive power (summations of 1.1.5 above)
   1.2.4 Per phase and fixed three phase total load apparent power (VA)
   1.2.5 Per phase and fixed three phase total load power factor (PF)

Stored un-scaled waveform values (1.1 above) are also used to derive the following total harmonic distortion data:
1.3 Total Harmonic Distortion (THD) values:
   1.3.1 Voltage phase to neutral (×3)
   1.3.2 Per phase load current (×12 or ×33)

One cycle THD values are derived for each of the above values approximately once every Y seconds (Y typically is 2).

2. Peak Electrical Demand Control

Electric power control routines are available to limit peak electrical demand (kw), including the following:

2.1 Evening Light Load Demand Control

This algorithm limits the total electrical demand for a facility by limiting the load associated with heating/cooling during evening periods when lighting load is significantly increased by the addition of parking lot and building signage lights. This algorithm is applicable to facilities where heating/cooling is handled by multiple individually controllable heating/cooling units—typically referred to as roof top units (RTUs), e.g., air conditioners, and any other type of electrical load that is suitable for control such as fans and motors.

For periods of time during which additional evening lighting is required, at least one RTU that has been identified as an at least one lowest priority unit (least critical to maintaining environmental comfort), is automatically switched off for the reminder of the evening lighting time period (7:00 PM to facility e.g., a predetermined interval of, say 15, 30, or 60 minutes, depending upon the specific utility tariff) is predicted to exceed the highest peak demand for any previous demand interval during that day, additional RTUs can be temporarily switched off for the remainder of each demand interval as required to keep the peak demand from exceeding the previous peak for that day. RTUs call be prioritized such that units of lesser importance are switched off first. Critical RTUs may not be included in the demand limiting control scheme.

2.2 RTU Multiplexing Demand Control

This algorithm is applicable to facilities where heating/cooling is handled by multiple individually controllable roof top units (RTUs), and can be used in conjunction with the algorithm of 2.1 above for evening light load demand control. This algorithm continuously limits the total electrical demand for a facility by coordinating the operation of all RTUs such that only a limited number of RTUs are drawing full load at any point in time, while allowing all RTUs to operate periodically. This is in contrast to multiplexing where each RTU would take its turn operating.

With this algorithm, RTUs can be grouped for time-shared operation (multiplexing). Each group is allowed to operate at normal setpoint targets for a limited period of time, followed by a period during which the setpoint target is significantly raised such that RTUs in this group do not draw full electrical load under normal conditions. Groups are coordinated in operation such that one group is operating at normal setpoint targets while other groups are operating with temporarily raised setpoints.

For example, consider a facility with six RTUs. With this control scheme, two RTUs might be identified as highly important to environmental comfort, and are allowed to always operate at the facility's target temperature for cooling, such as 74 degrees F. The other four RTUs are divided into two groups of two RTUs, referred to as Group 1 and Group 2. Each group alternates between 20 minute periods of operation at the normal setpoint of 74 degrees, and 20 minute periods of operation at a raised setpoint of 77 degrees. Group 1 operates normally while Group 2 operates at a raised setpoint, and then groups alternate setpoint positions. As a result, only four of six RTUs operate at full load at any moment in time.

This technique can be used to limit RTU operation in any combination that is determined to be appropriate for a given facility.

3. Solar Calculator for Lighting Control w/Photo Sensor Override

This algorithm uses the geographical latitude and longitude of a facility to automatically calculate the sunrise and sunset time for a particular calendar day—to determine when external lighting should be switched on and off. Input from a photo sensor is also used to automatically turn lights on and off in response to unexpected darkness.

4. Instantaneous Power Derived from Energy Pulses

This algorithm measures the time duration between energy pulses (kwh) from traditional electric power meters to determine instantaneous power (kw). Instantaneous power values are needed for real time control algorithms such as the foregoing. This algorithm allows existing electric meters equipped with pulse outputs to be used in such control schemes, thus leveraging a facility's installed power management and control infrastructure.

5. Firmware Program Flow Description

The algorithms are part of the software/firmware that determines the operation of a monitor/controller 212 according to the present invention.

Figure 12A:
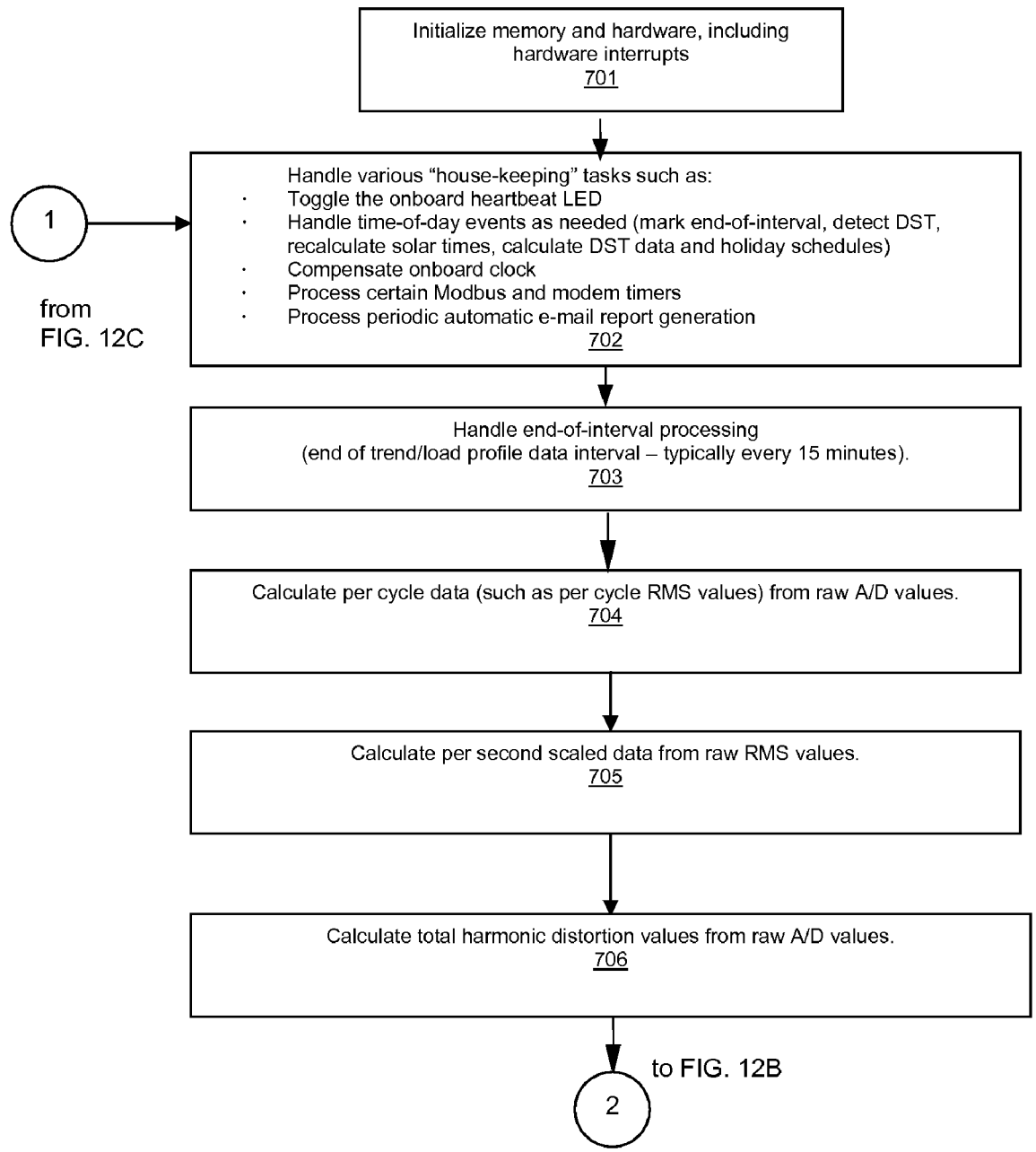
FIGS. 12A, 12B, and 12C illustrate a flow diagram of control software/firmware according to an EMS, other than the aspect of the EMS being linked to the SS.
Figure 12B:
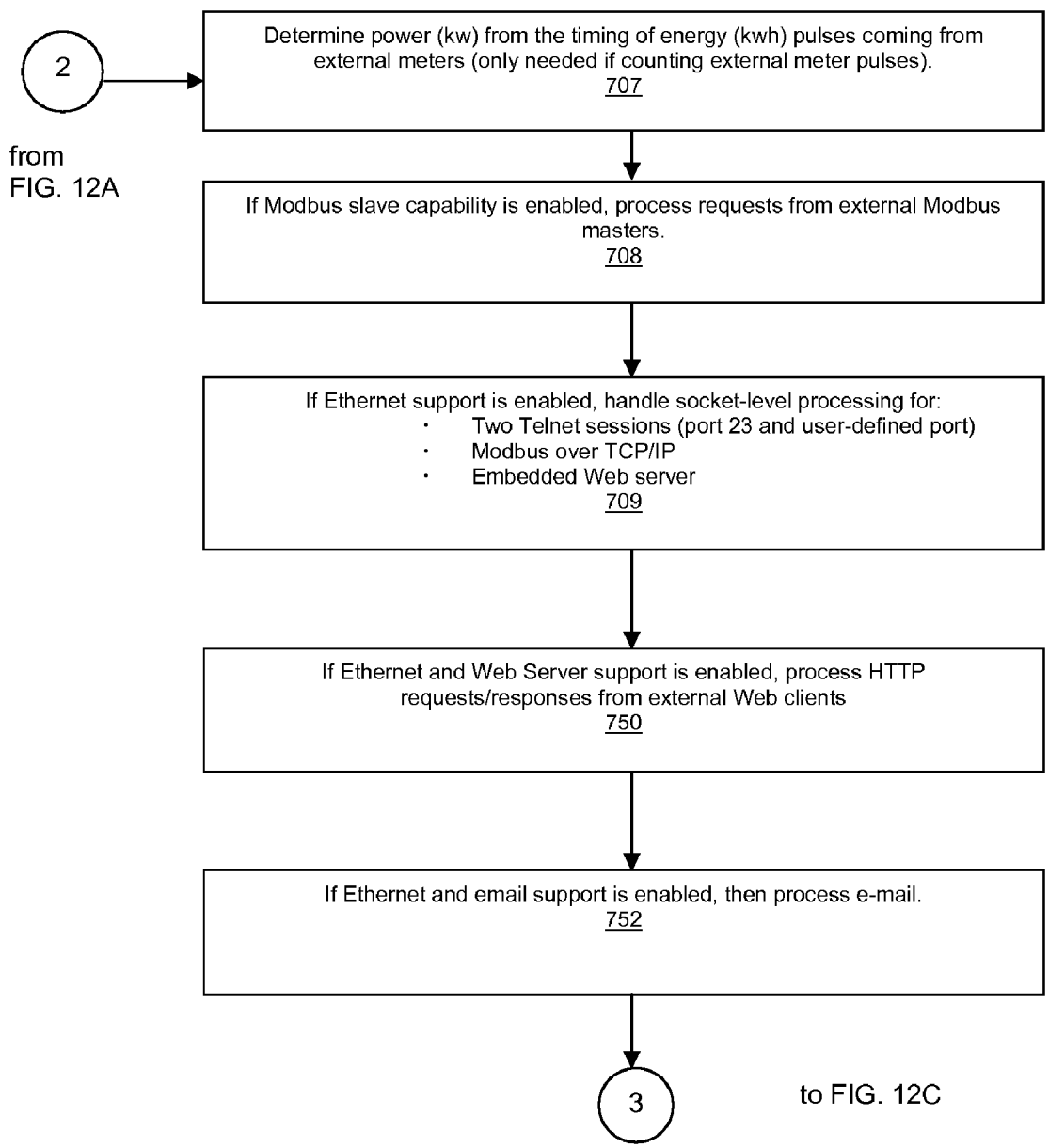
Figure 12C:
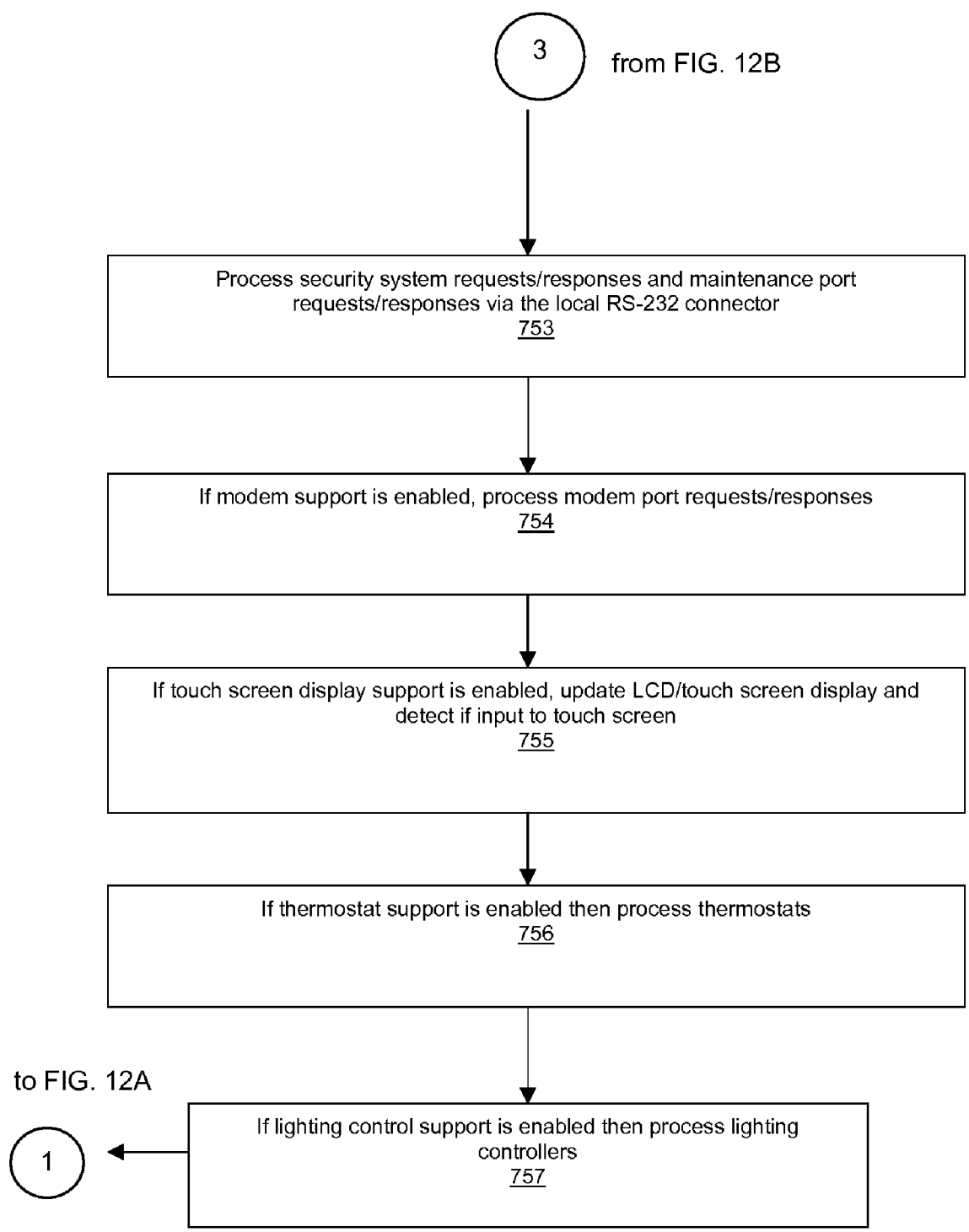

Referring now to FIGS. 12A, 12B and 12C, at the highest level, the firmware processing/logic flow is a main program loop that executes continuously, except when execution is preempted by the following interruption triggers:

Periodically by a hardware timer interrupt, which primarily handles analog to digital conversion processing at the chip level which reads and stores raw A/D values for processing by other routines.

Periodically by a hardware timer interrupt which primarily handles the following processing:
1. Modem ring detect
2. Modbus protocol timer
3. Lighting control protocol timer
4. Reading hardware status inputs
5, File transfer timer Asynchronously by various serial data port hardware interrupts to process incoming and outgoing characters on these ports, one of these ports is the dynamic data link to the security system.

Firmware Overview

Referring now to FIGS. 12A, 12B and 12C, an example of a downloaded software/firmware begins by initialized memory and hardware, including hardware interrupts at step 701. Once the processing is initialized at step 701, the process returns to step 702 at which the central ongoing housekeeping functions are performed:

the onboard heartbeat is toggled;
time-of-day events are handled as required, e.g., detecting changes in daylight savings time (DST) and making adjustments accordingly;
compensation is made for drift of the onboard clock;
modem and Modbus timers are processed; and
regularly scheduled e-mail reports are generated.

Next, at step 703 end-of-interval processing is accomplished, e.g., by calling the appropriate routines. Then, cycle data and per second scaled data is calculated by invoking routines at steps 704 and 705, respectively. Total harmonic distortion is calculated at step 706.

Next, power is determined from the timing of energy pulses coming from external meters (if any) at step 707, and any requests from ModBus external masters are processed at step 708.

Then, if Ethernet support is enabled socket-level processing is performed comprising for at least two Telnet sessions, Modbus over TCP/IP, and an embedded Web server at step 709. At step 750, if Web server support is also enabled, then HTTP requests/responses are processed, and new date and time values for use within web pages are stored. If e-mail support is enabled then e-mail is processed at step 752. E-mail processing includes a) accessing the designated POP3 server to check for new incoming messages, b) interpreting the content of any new messages to queue up response report generation, c) building any e-mail reports that are queue up for processing, and d) accessing the designated SMTP server to send any reply messages that are ready for transmission.

At step 753, RS-232 port processing is performed to process incoming maintenance port request message strings, and prepare appropriate response message strings. This also includes processing security system requests and responses.

At step 754 any enabled modem support is performed. This support includes handling of modem connection and processing request and response message strings.

If there is a touch screen 517 it is serviced at step 755 to look for input from the touch screen (operator touch) and to update the touch screen graphical display 517 as necessary.

If there are thermostats being managed then they are serviced at step 756 to read environmental variables and thermostat settings, and to update thermostat setpoints as dictated by various control algorithms.

Finally, any required lighting control support is performed at step 757 to turn on or off multiple lighting zones as dictated by various control algorithms.

The processing loops around to step 702, performing this loop of steps continuously unless interrupted by a higher priority task. After servicing the higher priority task, control is returned to the interrupted step until another higher priority task needs servicing by the processor.

While preferred embodiments have been shown and described, various modifications and substitutions may be made thereto without departing from the spirit and scope of the present invention. For example, while the local dynamic data link is shown as a cable, it can be a wireless link, or a fiber optic cable. The communications there between could be either analog of digital. Accordingly, the present invention has been described by way of illustrations and not limitations.

We claim:

1. A compact power management device for simultaneously monitoring a plurality of individual energy sub-loads, comprising:
an integrated monitor unit, including:

a multi-circuit energy monitoring module of an energy management system (EMS) that directly and simultaneously monitors energy usage as a form of power of the plurality of individual energy sub-loads to generate a plurality of measurements of energy usage by said plurality of energy sub-loads;

at least one program for using said plurality of measurements of energy usage in a first pre-determined manner, said at least one program selected from the group consisting of firmware and software, each said at least one program downloadable via a communications network, each said at least one program locally stored on the device, each said at least one program comprising at least one pre-determined algorithm, each said at least one program comprising at least one member of the group consisting of at least one schedule, at least one setpoint and at least one report parameter; and said first pre-determined manner including said monitor module selecting and executing said at least one program, a single housing unit for housing components of the monitor module within 24 inches of one another, and a local display coupled to the integrated combination monitor/control unit, wherein the communications network is connected to the integrated monitor unit, optionally said EMS includes a control module operatively coupled to the energy monitoring module to control energy usage by the said at least one energy load in a first pre-determined manner based on at least one said measurement of energy usage, wherein said control module controls at least one said energy sub-load;

wherein at least one module of the group consisting of said monitor module and said optional control module is configured for further performing processing to accomplish at least one of the group consisting of alarm notification, exception reporting, and periodic reporting, wherein said at least one of alarm notification, exception reporting, and periodic reporting are output to at least one of the communication network and the local display, and a security monitoring module of a security system (SS), said SS being operatively coupled to the EMS, said security monitoring module has means to detect at least one alarm condition, wherein said EMS and SS are suited for arrangement locally within a building being monitored, said EMS has first means to communicate with at least one entity selected from the group consisting of police department, fire department, security company, custodial personnel, first responder and facilities manager, said SS has second means to communicate with at least one entity selected from the group consisting of police department, fire department, security company, custodial personnel, first responder and facilities manager;

wherein the EMS has means to automatically provide the first means to communicate as an alternative back up communications means to report SS alarms and/or other SS communications to said at least one entity when the SS communications means is unavailable.

2. The power management device of claim 1, wherein said SS is operatively coupled to said EMS via a local dynamic data link, and said security monitoring module has means to detect at least one or more alarm conditions and notify said EMS of a detected alarm, and said EMS further comprising a control module for controlling an operation of said at least one energy sub-load, said control module controlling a function selected from the group consisting of (i) turning building lights on and off at least once, (ii) turning video surveillance cameras on and off; and (iii) activating and deactivating alarms.

3. The power management device according to claim 2, wherein said power management device embeds energy management system algorithms and security system algorithms in a firmware in one or more microprocessors of the power management device.

4. The power management device of claim 2, wherein said power management device embeds energy management system algorithms and security system algorithms in a software locally resident in the power management device.

5. The power management device according to claim 2, wherein said security module detects a plurality of categories of alarm conditions and said EMS controls the operation of the energy load according to a respective category of alarm conditions.

6. The power management device of claim 2, wherein the EMS has the capability of ascertaining a status of the security system (SS) within a building and responding if the security module detects a failure of the security system.

7. The power management system according to claim 2, wherein the local dynamic data link comprises a wireless link.

8. The power management system according to claim 2, wherein the local dynamic data link comprises a wired link, and further comprising a backup link that is wireless.

9. The power management system according to claim 2, wherein the security monitoring module is operatively coupled to the energy monitoring module; and a local dynamic data link for exchange of communications between the energy monitoring module and the security monitoring module, and wherein at least one of:
  (i) said security monitoring module has the capability to check a status of said energy monitoring module over the local dynamic data link between the energy monitoring module of the power management device and a security system (SS) within a building; and
  (ii) said energy module has the capability to check a status of said security monitoring module over the local dynamic data link between the energy monitoring module of the power management device and a security system (SS) within a building.

10. The power management system according to claim 9, said EMS further includes a control module operatively coupled to the energy monitoring module to control energy usage by the said at least one energy load in a first predetermined manner that is based on the at least one measurement of energy usage, wherein said control module controls said at least one energy load.

11. The power management system of claim 10, further comprising that said security system (SS) has means for detecting when an entry into a building area is one of authorized and unauthorized,
  wherein said security monitoring module has the capability to check a status of said energy monitoring module over the local dynamic data link between the energy monitoring module of the power management device and a security system (SS) within a building.

12. The power management device according to claim 1, wherein the power management device communicates over at least one Wide Area Data Link.

13. The power management device according to claim 1, wherein the EMS communicates over a first wide area data link, and the SS communicates over a second wide area data link, and the EMS is coupled to the SS via a third data link comprising a local dynamic data link.

14. The power management system according to claim 1, comprising:
said control module operatively coupled to the energy monitoring module to control energy usage by the said at least one energy load in a first pre-determined manner that is based on the at least one measurement of energy usage, wherein said control module controls said at least one energy load.

15. The power management system according to claim 1, wherein the single housing unit houses components of the monitor module and control module within 24 inches of one another.

16. A power management system comprising a power management device comprising:
an energy monitoring module that directly monitors energy usage of at least one energy load to generate at least one measurement of energy usage by said at least one energy load; and
a security monitoring module operatively coupled to the energy monitoring module; and a local dynamic data link for exchange of communications between the energy monitoring module and the security monitoring module and wherein at least one of:
(i) said security monitoring module has the capability to check a status of said energy monitoring module over the local dynamic data link between the energy monitoring module of the power management device and a security system (SS) within a building; and
(ii) said energy module has the capability to check a status of said security monitoring module over the local dynamic data link between the energy monitoring module of the power management device and a security system (SS) within a building;
said EMS includes a control module operatively coupled to the energy monitoring module to control energy usage by the said at least one energy load in a first pre-determined manner that is based on the at least one measurement of energy usage, wherein said control module controls said at least one energy load;
said security system (SS) detects when an entry into a building area is one of authorized and unauthorized,
wherein when the security module determines that entry into the building is authorized, the security system has means to communicate with the control module of said EMS to illuminate a predetermined portion of the building.

17. The power management system according to claim 16, wherein an area of the predetermined portion of the building that is illuminated depends on the time of day.

18. The power management system according to claim 16, wherein an area of the predetermined portion of the building that is illuminated depends on the particular day of the week in which it occurs.

19. A power management system comprising a power management device comprising:
an energy monitoring module that directly monitors energy usage of at least one energy load to generate at least one measurement of energy usage by said at least one energy load; and
a security monitoring module operatively coupled to the energy monitoring module; and a local dynamic data link for exchange of communications between the energy monitoring module and the security monitoring module and wherein at least one of:
(i) said security monitoring module has the capability to check a status of said energy monitoring module over the local dynamic data link between the energy monitoring module of the power management device and a security system (SS) within a building; and
(ii) said energy module has the capability to check a status of said security monitoring module over the local dynamic data link between the energy monitoring module of the power management device and a security system (SS) within a building;
said EMS includes a control module operatively coupled to the energy monitoring module to control energy usage by the said at least one energy load in a first pre-determined manner that is based on the at least one measurement of energy usage wherein said control module controls said at least one energy load;
said security system (SS) detects when an entry into a building area is one of authorized and unauthorized,
wherein when the security module determines that entry into the building is unauthorized, the SS has means to communicate the unauthorized entry to the EMS so that the control module identifies the portion of the building by one of flash building lights, activation of video surveillance cameras, and activation of alarms within a predetermined portion of the building.

20. A method of power and security management comprising the steps of:
(a) providing a compact power management device for simultaneously monitoring a plurality of individual energy sub-loads for lighting, comprising:
an integrated monitor unit, including:
a multi-circuit energy monitor module of a local energy management system (EMS) that directly and simultaneously monitors energy usage as a form of power of the plurality of individual energy sub-loads to generate a plurality of measurements of energy usage by said plurality of energy sub-loads;
at least one program for using said plurality of measurements of energy usage in a first pre-determined manner, said at least one program selected from the group consisting of firmware and software, each said at least one program downloadable via a communications network, each said at least one program locally stored on the device,
each said at least one program comprising at least one pre-determined algorithm,
each said at least one program comprising at least one member of the group consisting of at least one schedule, at least one setpoint and at least one report parameter; and
said first pre-determined manner including said monitor module selecting and executing said at least one program,
a single housing unit for housing components of the monitor module within 24 inches of one another, and
a local display coupled to the integrated combination monitor/control unit, wherein the communications network is connected to the integrated monitor unit,
optionally said EMS includes a control module operatively coupled to the energy monitoring module to control energy usage by the said at least one energy load in a first pre-determined manner that is based on at least one said measurement of energy usage, wherein said control module controls at least one said energy sub-load;
wherein at least one module of the group consisting of said monitor module and said control module is configured for further performing processing to accomplish at least one of the group consisting of alarm notification, exception reporting and periodic reporting, wherein said at least one of alarm notification, exception reporting, and periodic reporting are output to at least one of the communication network and the local display, and (b) providing a security module of a local security system (SS), said EMS being coupled to said local SS, wherein the security module monitors a status of the monitor module;

said security monitoring module has means to detect at least one alarm condition;

wherein the Energy Management System (EMS) communicates with a first wide area data link, and the SS communicates with a second wide area data link, and the EMS is coupled to the SS via a third data link comprising a local dynamic data link, wherein the EMS comprises means for providing the first wide area data link as an alternative backup wide area data link via the local dynamic data link for the SS so that SS alarms and/or other security module data communications will be provided to at least one entity selected from the group consisting of police department, fire department, security company, custodial personnel, first responder and facilities manager when the SS wide area data link is unavailable.

21. The method according to claim 20, wherein said EMS and said SS are both arranged within a building.

22. The method according to claim 20, wherein the EMS controls at least one energy load comprising one of video surveillance cameras and alarms.

23. The method according to claim 22, further comprising:

(c) said SS notifying said monitor module of an alarm condition including a category; and (d) said monitor module controlling operation of said at least one energy load by performing one of:

(i) if said energy load comprises lights, at least one of turning a predetermined number of said lights on, dimming a predetermined number of said lights, and turning off a predetermined number of said lights;

(ii) if said energy load comprises surveillance equipment, turning on and off said surveillance equipment; and (iii) if said energy load comprises alarms, activating and de-activating said alarms.

24. The method according to claim 22, wherein said predetermined number of said lights being turned on, turned off, and dimmed are based on the severity code of a detected alarm condition.

25. The method according to claim 20, wherein the EMS controls at least one energy load comprising building lights.

26. The method according to claim 20, further comprising:

(a) (i) connecting the monitor module to said at least one energy load; and (b) (i) monitoring an operational status by said EMS of said at least one energy load.

27. The method according to claim 20, further comprising the step of the EMS detecting status of the SS via the local dynamic link and reporting a detected condition via the EMS wide area data link.

28. The method according to claim 20, comprising:

said control module operatively coupled to the energy monitoring module to control energy usage by the said at least one energy load in a first pre-determined manner that is based on the at least one measurement of energy usage, wherein said control module controls said at least one energy load.

29. The method according to claim 20, wherein the single housing unit houses components of the monitor module and control module within 24 inches of one another.

30. A method of power and security management comprising the steps of:

(a) providing a monitor module of a local energy management system (EMS) that directly monitors energy usage of at least one energy load to generate at least one measurement of energy usage by said at least one energy load; and (b) providing a security module of a local security system (SS) said EMS being coupled to said local SS, wherein the security module monitors a status of the monitor module;

wherein the Energy Management System (EMS) communicates with a first wide area data link, and the SS communicates with a second wide area data link, and the EMS is coupled to the SS via a third data link comprising a local dynamic data link, further comprising the step of the SS detecting status of the EMS via the local dynamic link and reporting a detected condition via the SS wide area data link.

31. A power management system device, comprising:

a power management device comprising:

an energy monitoring module that directly monitors energy usage of at least one energy load to generate at least one measurement of energy usage by said at least one energy load; and a security monitoring module is operatively coupled to the energy monitoring module; and a local dynamic data link for exchange of communications between the energy monitoring module and the security monitoring module, and wherein:

said security monitoring module has the capability to detect a status of said energy monitoring module over the local dynamic data link between the energy monitoring module of the power management device and a security system (SS) within a building;

said security monitoring module has the capability to report a detected condition via the SS wide area data link; and said energy module has the capability to check a status of said security monitoring module over the local dynamic data link between the energy monitoring module of the power management device and a security system (SS) within a building.

* * * * *